(12) United States Patent
Schoppmeier et al.

(10) Patent No.: US 10,805,047 B2
(45) Date of Patent: Oct. 13, 2020

(54) SYSTEM, METHOD AND APPARATUS FOR QOS SUPPORT AND RETRANSMISSION

(71) Applicant: Intel Corporation, Santa Clara, CA (US)

(72) Inventors: Dietmar Schoppmeier, Unterhaching (DE); Vladimir Oksman, Morganville, NJ (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 16/050,751

(22) Filed: Jul. 31, 2018

(65) Prior Publication Data

US 2019/0052405 A1 Feb. 14, 2019

Related U.S. Application Data

(60) Provisional application No. 62/636,021, filed on Feb. 27, 2018, provisional application No. 62/636,565, filed on Feb. 28, 2018.

(51) Int. Cl.
*G08C 25/02* (2006.01)
*H04L 1/18* (2006.01)
*H04L 1/00* (2006.01)
*H04L 12/851* (2013.01)
(Continued)

(52) U.S. Cl.
CPC ............ *H04L 1/0078* (2013.01); *H04L 1/009* (2013.01); *H04L 1/0018* (2013.01);
(Continued)

(58) Field of Classification Search
CPC ..... H04L 1/1887; H04L 1/0018; H04L 47/32; H04L 1/0078; H04L 1/1838; H04L 1/08;
(Continued)

(56) References Cited

U.S. PATENT DOCUMENTS 7,782,872 B2 * 8/2010 Rinne ................. H04L 47/10
370/395.43
2005/0281278 A1 * 12/2005 Black ................ H04W 72/1236
370/412

(Continued)

FOREIGN PATENT DOCUMENTS

EP 2942891 A1 11/2015
WO 2007/022441 A1 2/2007

OTHER PUBLICATIONS

Extended European Search Report for European Patent Application No. 19153628.3 dated Jul. 15, 2019.
(Continued)

*Primary Examiner* — Guerrier Merant
(74) *Attorney, Agent, or Firm* — 2SPL Patent Attorneys

(57) ABSTRACT

A transceiver associated with a wireline communication system is disclosed. The transceiver comprises one or more processors configured to associate a quality of service (QoS) grade tag to each data packet of a plurality of data packets to be transmitted and assemble a data transfer unit (DTU) comprising one or more or a part of a data packet of the plurality of data packets, wherein the one or more or the part of the data packet are encapsulated into a plurality of DTU frames within the DTU. The one or more processors is further configured to associate a highest DTU tag to the assembled DTU, wherein the highest DTU tag is indicative of a highest QoS grade associated with the DTU frames of the assembled DTU; and determine a schedule for transmission or retransmission of the assembled DTU, based on the highest DTU tag of the assembled DTU.

24 Claims, 11 Drawing Sheets

(51) Int. Cl.
*H04L 12/841* (2013.01)
*H04L 12/823* (2013.01)

(52) U.S. Cl.
CPC .......... *H04L 1/1809* (2013.01); *H04L 1/1838* (2013.01); *H04L 1/1841* (2013.01); *H04L 1/1887* (2013.01); *H04L 1/1896* (2013.01); *H04L 47/24* (2013.01); *H04L 47/28* (2013.01); *H04L 47/32* (2013.01); *H04L 2212/00* (2013.01)

(58) Field of Classification Search
CPC ..... H04L 47/28; H04L 1/1809; H04L 1/1896; H04L 1/009; H04L 45/72; H04L 1/0045; H04L 1/18; H04L 1/1607; H04L 69/324; H04L 49/552; H04L 1/1835; H04L 47/10; H04L 1/0041; H04L 12/5601; H04L 47/2441; H04L 1/1874; H04L 47/2433; H04L 1/0057; H04L 45/00; H04L 2012/5647; H04L 47/24; H04L 2212/00; H03M 13/00; H03M 13/09; H03M 13/2707; H03M 13/091
See application file for complete search history.

(56) References Cited

U.S. PATENT DOCUMENTS

2008/0259833 A1    10/2008  Ozturk et al.
2009/0300450 A1*  12/2009  Tzannes ................ H03M 13/00
                                                                    714/748
2010/0014860 A1*   1/2010  Nakagawa ......... H04N 21/2389
                                                                      398/66
2012/0182999 A1    7/2012  Pannell

OTHER PUBLICATIONS

"G.Fast Enabling the Gigabit Society." White Paper. Adtran. Apr. 2017. 8 pages.
Mastrangelo, Teresa. "G.fast and furious in 2018." Jan. 9, 2018. Adva Optical Networking. 4 pages.
"G.Fast." ASSIA. https://www.assia-inc.com/). 2018. 4 pages.
"G.fast." Wikipedia. 7 pages.
Haas, Steven, et al. "VDSL as the PMD for EFM copper." Nov. 7, 2001. 18 pages.
Mariotte, Hubert. "Overview of ITU-T SG15 Q4 xDSL and G.(mg)fast." ITU. 37 pages.
"G.Fast: Proposal to solve inconsistent terminology." Source: TNO. Question(s): 4A/15. Study Group 15—Contribution 2289. International Telecommunication Union. Telecommunication Standardization Sector. Study Period 2009-2012. COM 15—C 2289—E. Sep. 2012. 3 pages.
Rezvani, B. "Multi-PHY Operation." !kenos Communications. IEEE 802.3ah meeting. Jan. 7, 2002. 12 pages.
"Communication to IEEE P802 concerning G.vdsl.f Foundation Recommendation." Source: ITU-T Question 4/15. Agreed to at ITU-T SG15/4, Aug. 6-10, San Francisco, California, USA. 2 pages.
Beck, Michael et al. Ethernet in the First Mile: an opportunity for xDSL?. 4 pages.

* cited by examiner

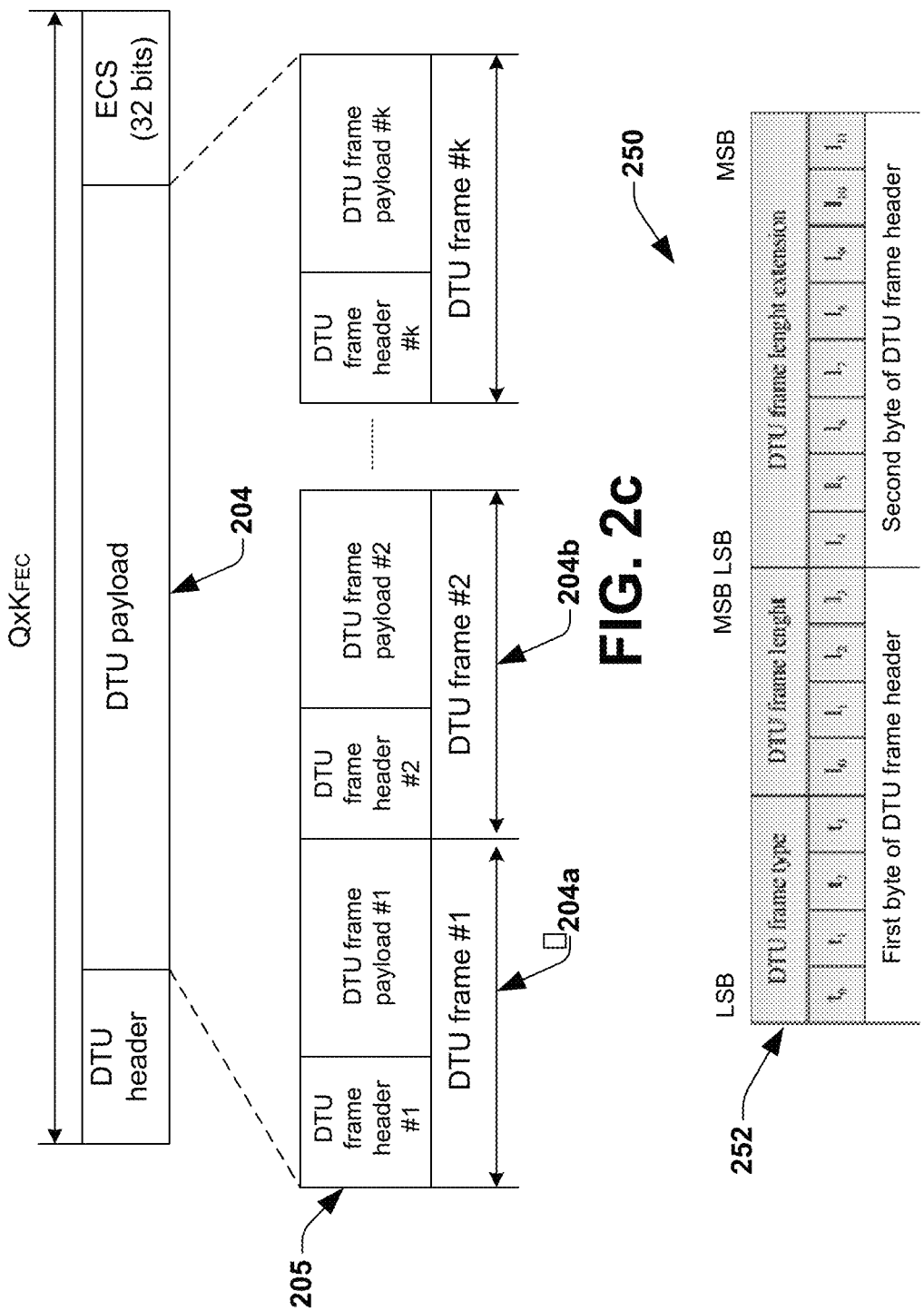

SYSTEM, METHOD AND APPARATUS FOR QOS SUPPORT AND RETRANSMISSION

REFERENCE TO RELATED APPLICATIONS

This application claims the benefit of provisional Application No. 62/636,021, filed Feb. 27, 2018, entitled "SYSTEM, METHOD AND APPARATUS FOR QoS RETRANSMISSION FOR MG. Fast", and provisional Application No. 62/636,565, filed Feb. 28, 2018, entitled "SYSTEM, METHOD AND APPARATUS FOR QoS RETRANSMISSION FOR MG. Fast", contents of which are herein incorporated by reference in their entirety.

FIELD

The present disclosure relates to wireline communication systems and in particular, to a system and method for retransmission of data packets in wireline communication systems that employ a differentiation between QoS grades.

BACKGROUND

Modern wired access systems can bring a huge bandwidth to premises, such as multi-gigabit bit rates provided by MGFAST. This huge bandwidth is usually used to deliver multiple services, which are characterized by different quality of service (QoS) requirements. Thus, the bandwidth transmitted from a distribution point unit (DPU) to the customer premises contains multiple services, which are usually packet-based, i.e. consist of sequences of data packets with variable length. Services typically delivered to customer premises differ by bandwidth and latency requirements. With high throughput of modern systems, bandwidth can be carefully assigned, but latency depends on particular conditions of the line and may differ from one packet to another (delay variation). The QoS grade associated with each service characterizes the maximum latency allowed for this packet, and packets that are eventually delayed more than the allowed maximum latency, are dropped. Therefore, one of the main tasks of modern systems is to reduce packet loss due to excessive latency. In other words, modern systems shall distinguish services by latency requirements and respect those latency requirements, expressed in a particular QoS grade. This is especially important when multi-gigabit wireline serves as a connection or a backhaul for 5G wireless station, e.g. a 5G WiFi hotspot inside customer premises.

BRIEF DESCRIPTION OF THE DRAWINGS

Some examples of circuits, apparatuses and/or methods will be described in the following by way of example only. In this context, reference will be made to the accompanying Figures.

FIG. 2c illustrates a format of a DTU, according to another embodiment of the disclosure.

FIG. 2d illustrates a format of a DTU frame header 250, according to one embodiment of the disclosure.

DETAILED DESCRIPTION

Figure 1:
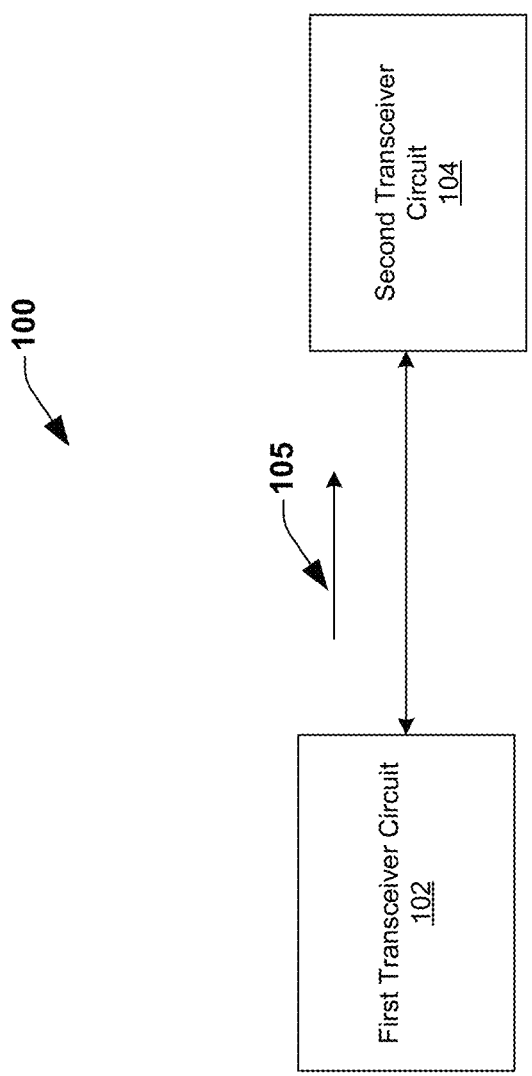
FIG. 1 illustrates a simplified block diagram of a wireline communication system, according to one embodiment of the disclosure.

In one embodiment of the disclosure, a transceiver associated with a wireline communication system is disclosed. The transceiver comprises a memory configured to store a plurality of instructions; and one or more processors configured to retrieve the plurality of instructions from the memory, and upon execution of the plurality of instructions is configured to associate a quality of service (QoS) grade tag to each data packet of a plurality of data packets to be transmitted, wherein the QoS grade tag is indicative of a QoS grade of the respective data packets. The one or more processors is further configured to assemble a data transfer unit (DTU) comprising one or more or a part of a data packet of the plurality of data packets, wherein the one or more or the part of the data packet are encapsulated into a plurality of DTU frames within the DTU, each DTU frame being associated with the QoS grade of a data packet encapsulated within the respective DTU frame. In some embodiments, the one or more processors is further configured to associate a highest DTU tag to the assembled DTU, wherein the highest DTU tag is indicative of a highest QoS grade associated with the DTU frames of the assembled DTU; and determine a schedule for transmission of the assembled DTU or retransmission of the assembled DTU, or both, based on the highest DTU tag of the assembled DTU.

In one embodiment of the disclosure, a transceiver associated with a wireline communication system is disclosed. The transceiver comprises a memory configured to store a plurality of instructions; and one or more processors configured to retrieve the plurality of instructions from the memory, and upon execution of the plurality of instructions is configured to associate a quality of service (QoS) grade tag to each data packet of a plurality of data packets to be transmitted, wherein the QoS grade tag is indicative of a QoS grade of the respective data packets. The one or more processors is further configured to assemble a data transfer unit (DTU) comprising one or more or a part of a data packet of the plurality of data packets, wherein the one or more or the part of the data packet are encapsulated into a plurality of DTU frames within the DTU, each DTU frame being associated with the QoS grade of a data packet encapsulated within the respective DTU frame. In some embodiments, the one or more processors is further configured to associate a lowest DTU tag to the assembled DTU, wherein the lowest DTU tag is indicative of a lowest QoS grade associated with the DTU frames in the assembled DTU; and determine an age at which the assembled DTU shall be discarded based on the lowest DTU tag of the assembled DTU.

In one embodiment of the disclosure, a transceiver associated with a wireline communication system is disclosed. The transceiver comprises a memory configured to store a plurality of instructions; and one or more processors configured to retrieve the plurality of instructions from the memory, and upon execution of the plurality of instructions is configured to receive a data transfer unit (DTU) comprising one or more or a part of a data packet, wherein the one or more or the part of the data packet are encapsulated into a plurality of DTU frames within the DTU, each DTU frame being associated with a QoS grade of a data packet encapsulated within the respective DTU frame. The one or more processors is further configured to determine an age at which the DTU shall be discarded, based on information of a lowest QoS grade associated with the DTU, provided within the DTU.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from conte8, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from conte8 to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, the bandwidth transmitted from a distribution point unit (DPU) to the customer premises contains multiple services, which are usually packet-based, i.e. consist of sequences of data packets with variable length. Typically, the various services are characterized by different quality of service (QoS) requirements. The QoS grade associated with each service characterizes the maximum latency allowed for this packet, and packets that are eventually delayed more than allowed, are dropped. Therefore, one of the main tasks of modern systems is to reduce packet loss due to excessive latency. In current implementations of wireline systems, in order to reduce packet loss, QoS grades are associated with certain priority of transmission for packets carrying different services. In this way, some packets are delayed more than others, allowing transmission resources for services requiring lower latency. Ethernet standard 802.3 defines up to 8 different priorities, for instance. Further, in some embodiments, in order to avoid packet loss, some systems (e.g., ADSL2 and VDSL2) define separate paths for high and low latency (interleaved and non-interleaved path). Furthermore, in some embodiments, priority is used to resolve collision. For example, if collision happens, packets with higher priority are transmitted first.

Current high-speed wireline systems such as G.fast, G.mgfast etc. encapsulate user packets into Data Transfer Units (DTUs), which comprise a number of frames (DTU frames), indicating start and end of every user packet encapsulated in the DTU by special code in the DTU frame header. However, no indication on the QoS grade (or priority) of the user packet is included for transmission packets, so service slicing is not possible (i.e, packets are transmitted in the order they enter the transceiver and retransmitted with no specific requirements on packet priority). Every DTU (and, respectively, every packet encapsulated in this DTU) is retransmitted up to the configured maximum one-way latency, i.e., until the packet reaches the pre-configured maximum latency time (e.g., a parameter delay_max). Intensive use of retransmission to cover impulse noise is typical for modern wide bandwidth access systems, such as VDSL2, G.fast, and now MGFAST. Sometimes powerful impulse noise erases hundreds of milliseconds of transmit signal, and multiple retransmission attempts are required to convey data packets through the line. The number of these attempts is bounded by maximum retransmission excess delay (e.g., the parameters delay_max ds, delay_max us etc.). In the current systems, all data packets have the same priority (or QoS grade), and therefore, the current systems do not allow to drop individual packets for which multiple retransmissions result in excessive delay. Therefore, the current high-speed wireline systems such as G.fast is also incapable to set the retransmission order based on the QoS grades defined for particular user data packets.

In order to overcome the above disadvantages, a system and a method for transmission and retransmission of data packets encapsulated into data transfer units (DTUs) that employ a differentiation between QoS grades of different packets is proposed in this disclosure. In particular, in one embodiment, a transceiver configured to associate a QoS grade tag to each data packet submitted for transmission and schedule a transmission or retransmission of a DTU based on the QoS grade tags of the data packets encapsulated within the DTU is proposed. The QoS grade tag is indicative of the QoS grade of a respective data packet. In some embodiments, each QoS grade is associated with an appropriate maximum latency, which is set by the user or by default. In some embodiments, the number of retransmissions for each DTU is determined by the maximum retransmission excess latency (e.g., defined by the parameter delay_max) associated with the particular QoS grade. Similarly, in another embodiment, a transceiver configured to receive a DTU having QoS grades of respective data packets encapsulated into the transmission format of each particular DTU and perform packet sorting based on the QoS grade. In some embodiments, the QoS grade tags enables the transceiver to arrange transferred packets in the right order of their QoS grades or distribute packets over QoS queues for further forwarding more efficiently. In some embodiments, associating QoS grade tags with each data packet of the DTU enables to achieve service slicing based on the QoS grades.

FIG. 1 illustrates a simplified block diagram of a wireline communication system 100, according to one embodiment of the disclosure. In some embodiments, the wireline communication system 100 can comprise communication systems that comply with the gigabit standard, for example, G.fast, MGfast etc. However, other wireline communication systems are also contemplated to be within the scope of this disclosure. The wireline communication system 100 comprises a first transceiver circuit 102 and a second transceiver circuit 104 configured to communicate with each other through cables or wires, for example, optical fibers, coaxial conductors, copper conductors or twisted wire pairs. In some embodiments, the first transceiver circuit 102 and the second transceiver circuit 104 are positioned at two separate locations. For example, in some embodiments, the first transceiver circuit 102 may be located at a distribution point unit (DPU) and the second transceiver circuit 104 may be located at a network terminal (NT) at the customer premises. However, in other embodiments, the first transceiver circuit 102 and the second transceiver circuit can be in other locations, different from above, for example, central office location, cabinet etc. The wireline communication system 100 in FIG. 1 is shown to include only two transceiver circuits or transceivers, for the ease of reference. However, in other embodiments, the wireline communication system 100 may include more than two transceiver circuits.

In some embodiments, the first transceiver circuit 102 is configured to transmit and receive one or more data packets. Similarly, the second transceiver circuit 104 is configured to transmit and receive one or more data packets. However, for the ease of explanation, in this embodiment, the first transceiver circuit 102 is explained as a transmitting transceiver that performs the transmit side operations and the second transceiver circuit is explained as a receiving transceiver that performs the receive side operations. However, in other embodiments, the first transceiver circuit 102 may be a receiving transceiver and the second transceiver circuit 104 may be a transmitting transceiver. In some embodiments, the first transceiver circuit 102 and the second transceiver circuit 104 comprises transceivers that comply with the recommendation ITU-T G.9701 that supports packet-based transport protocol specific transmission convergence (TPS-TC). In some embodiments, the first transceiver circuit 102 and the second transceiver circuit 104 can comprise FTU-O/FTU-R transceivers defined in the recommendation ITU-T G.9701, further details of which are given in embodiments below.

In some embodiments, the first transceiver circuit 102 is configured to receive a plurality of data packets (e.g., Ethernet packets) to be transmitted to the second transceiver circuit 104. In some embodiments, the first transceiver circuit 102 may be configured to receive the plurality of data packets from an external interface associated therewith, for example, a peer transceiver. In some embodiments, the various data packets may belong to services with particular quality of service (QoS) requirements, characterized by a QoS grade. In some embodiments, the QoS grades of the plurality of data packets received for transmission may be indicated to the first transceiver circuit 102 by the upper layers by using QoS grade tags corresponding to the respective data packets. In some embodiments, QoS grade tag is a parameter indicative of the QoS grades associated with the data packets and is defined to identify the QoS grade associated with a respective data packet. In some embodiments, the QoS grade tag is a flow control primitive (parameter) associated with a data packet that is determined by the upper layers, for example, Tx QoS grade tag. In some embodiments, the data packets referred to herein may comprise user data packets or embedded operations channel (eoc) packets. In some embodiments, eoc packets are associated with the lowest QoS grade. Upon receiving the plurality of data packets, the first transceiver circuit 102 is configured to associate a plurality of QoS grade tags respectively to the plurality of data packets based on the indication received from the upper layers.

In one example embodiment, three QoS grades are defined. For example,
0—for streaming and all regular services with delays 10 ms and bigger;
1—low latency services, such as VoIP (<5 ms latency);
2—ultra low latency services (ULLS, <1 ms).
However, in other embodiments, the QoS grades may be defined differently. For example, in some embodiments, more or less than 3 QoS grades may be defined. Further, the requirements for defining the various QoS grades may be different in other embodiments. In some embodiments, the various QoS grades are defined by the upper layers (e.g., layer 2+). In some embodiments, a plurality of QoS grades (typically 8 QoS grades) are defined on Layer 2+, which are then mapped to a reduced number of QoS grades (e.g., 3 QoS grades) at layer 1, to reduce complexity. In some embodiments, each QoS grade is associated with particular one-way latency requirements. Therefore, each of the QoS grade is associated with a predefined maximum retransmission excess delay, defined by a parameter delay_max, based on the one-way latency requirements for the data packets belonging to a particular QoS grade. For example, in some embodiments, the QoS grade 0 is associated with delay_max 0 (maximum value of delay_max), the QoS grade 1 is associated with delay_max 1, and the QoS grade 2 is associated with delay_max 2 (minimum value of delay_max). In some embodiments, the highest QoS grade is associated with data packets having lowest latency requirements and the lowest QoS grade is associated with data packets having highest latency requirements. In some embodiments, the delay_max associated with the various QoS grades are predefined or defined by the user and implied via upper layer management.

Figure 2A:
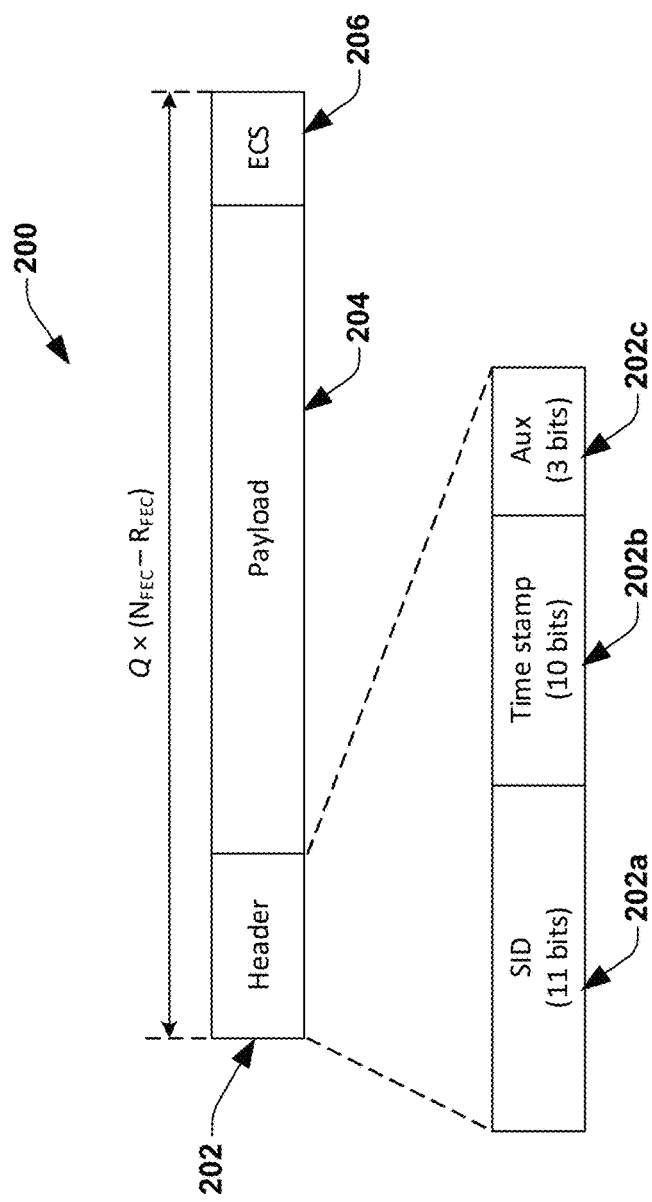
FIG. 2a illustrates a format of a DTU, according to one embodiment of the disclosure.

Once the plurality of data packets is associated with their respective QoS grade tags, the first transceiver circuit 102 is further configured to assemble a data transfer unit (DTU) 105 comprising one or more or a part of a data packet of the plurality of data packets for subsequent transmission to the second transceiver circuit 104, the format of which is explained with respect to FIG. 2a below. In some embodiments, the first transceiver circuit 102 may be configured to assemble a plurality of DTUs, each DTU comprising one or more or part of a data packet of the plurality of data packets for subsequent transmission to the second transceiver circuit 104. In some embodiments, the first transceiver circuit 102 is further configured to transmit the assembled DTU 105 to the second transceiver circuit 104. FIG. 2a illustrates a format of a DTU 200, according to one embodiment of the disclosure. In some embodiments, DTU 200 depicts a format of the assembled DTU 105 indicated in FIG. 1. In some embodiments, the DTU 200 comprises a three-byte DTU header 202, a DTU payload 204, and an error check sequence (ECS) 206. In some embodiments, the total number of bytes in a DTU shall be:

$$N_{DTU} = Q \times K_{FEC} \quad (1)$$

where:
 $K_{FEC}$ is the number of information bytes of the forward error correction (FEC) codeword;
 Q is an integer defining the number of FEC codewords in one DTU.

Figure 2B:
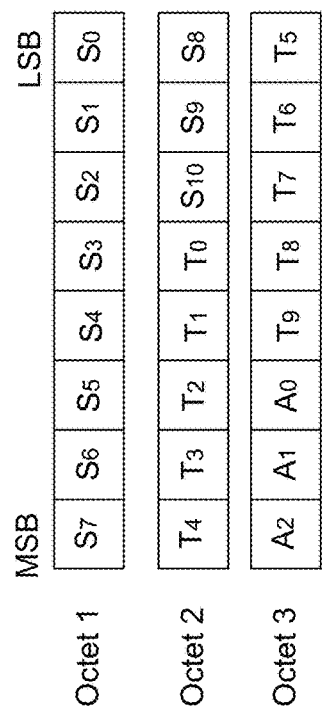
FIG. 2b illustrates a bit mapping of the DTU header bytes, according to one embodiment of the disclosure.

In some embodiments, the three-bytes DTU header 202 includes DTU sequence ID (SID, bits $S_0$-$S_{10}$) 202a, DTU time stamp (bits $T_0$-$T_9$) 202b, and Auxiliary bits (bits $A_0$-$A_2$) 202c. FIG. 2b illustrates a bit mapping of the DTU header bytes, according to one embodiment of the disclosure. The 11-bit SID field 202a is used to identify the particular DTU in a transmitted sequence of DTUs for re-ordering of received normal DTUs. The SID of a DTU is be assigned using an 11-bit modulo counter. The transmitter (e.g., the first transceiver circuit 102 in FIG. 1) shall increment the SID counter for every newly framed DTU. A retransmitted DTU shall have the same SID as for its first transmission. In some embodiments, the SID shall be initialized to $00_{16}$ and this shall be the SID of the first DTU transmitted in showtime. The SID of a dummy DTU shall also be assigned but using a separate modulo 2048 counter that shall be incremented by one for each transmitted dummy DTU. The SID of dummy DTUs shall be initialized to $00_{16}$ and this shall be the SID of the first dummy DTU transmitted in showtime. The value of the SID shall be coded as an unsigned integer on 11 bits [$S_{10}$ ... $S_0$], where $S_0$ is the LSB. The time stamp (TS) field 202b of DTU header 202 shall contain the value of a symbol count of a symbol that contains the bit $S_0$ of the header of this DTU, assuming that no retransmission occurs between the framing of the DTU and its transmission over the line. In the event of retransmission, the original time stamp value shall be preserved. The value of TS shall be coded as an unsigned integer on 10 bit [$T_9$ ... $T_0$], where $T_0$ is the LSB. In some embodiments, the auxiliary bits field 202c of the DTU header 202 includes information on the DTU type (e.g., 0=normal DTU, 1=dummy DTU).

The DTU payload 204 comprises user data packets or embedded operations channel (eoc) packets, or both to be conveyed by the DTU 200. The order in which data packets having the same QoS grade tags are encapsulated into the DTU payload 204 shall be the same as the order that these packets are submitted for transmission. The DTU payload 204 comprises a plurality of DTU frames 204a, 204b etc., as illustrated in FIG. 2c. Therefore, the data packets may be encapsulated within the DTU payload 204 into the plurality of DTU frames 204a, 204b etc., while each of the DTU frames (e.g., the DTU frame 204a) comprises a DTU frame header and a DTU frame payload. FIG. 2d illustrates a format of a DTU frame header 250, according to one embodiment of the disclosure. In some embodiments, the DTU frame header 250 indicates:
 the type of the DTU frame (bits [$t_3 t_2 t_1 t_0$]);
 the length of the DTU frame payload in bytes coded as either a 4-bit [$I_3$ ... $I_0$] or a 12-bit [$I_{11}$ ... $I_0$] unsigned integer, where $I_0$ represents the LSB.

Referring back to FIG. 1, in some embodiments, the first transceiver circuit 102 may be configured to encapsulate the one or more or the part of the data packet into a plurality of DTU frames within the DTU 105, as explained above with respect to FIG. 2c. In some embodiments, each DTU frame within the assembled DTU 105 may comprise a data packet or a part of a data packet associated with the assembled DTU 105. In some embodiments, each DTU frame of the plurality of DTU frames within the assembled DTU 105 has a QoS grade associated therewith indicative of the QoS grade (provided by the QoS grade tag) of the data packet or a part of the data packet encapsulated within the respective DTU frame. For example, in some embodiments, a DTU frame has a QoS grade of 1 associated therewith, if the data packet encapsulated within the DTU frame has a QoS grade tag of 1. In some embodiments, the first transceiver circuit 102 is further configured to provide an indication of the QoS grades associated with the DTU frames (or with the respective data packets) within the DTU 105. In some embodiments, providing indication of the QoS grades associated with the DTU frames within the DTU 105 enables to communicate information on the QoS grades of the various data packets associated with the DTU 105 to the second transceiver circuit 104. In some embodiments, the first transceiver circuit 102 is configured to provide an indication of the QoS grades associated with the DTU frames in DTU frame headers (e.g., the DTU frame header 250 in FIG. 2d) associated with the respective DTU frames. In some embodiments, the indication of the QoS grades associated with the DTU frames are provided as DTU frame types in DTU frame type field (e.g., DTU frame type field 252 in FIG. 2d) of the DTU frame header. Alternately, in other embodiments, the indication of the QoS grades associated with the DTU frames are provided in a separate field different from the frame type field associated with the DTU frame header. Further, in some embodiments, the first transceiver circuit 102 may be configured to provide an indication of the QoS grades associated with the DTU frames, at least partially, in a DTU header (e.g., the DTU header 202 in FIG. 2a) associated with the DTU 105. Furthermore, in other embodiments, the first transceiver circuit 102 may be configured to provide an indication of the QoS grades associated with the DTU frames differently than above.

In some embodiments, the first transceiver circuit 102 is further configured to determine a schedule for transmission of the assembled DTU 105 or retransmission of the assembled DTU 105, or both, based on the QoS grades associated with the DTU frames of the assembled DTU 105. In some embodiments, all the data and management DTUs that are NACKed or not acknowledged (due to loss of ACK/NACK indication from the second transceiver circuit 102) are assigned for retransmission. In some embodiments, in order to determine the schedule for transmission of the assembled DTU 105 or retransmission of the assembled DTU 105, or both, the first transceiver circuit 102 is configured to determine a highest QoS grade associated with the DTU frames within the assembled DTU 105 and associate a highest DTU tag (TG1) with the DTU 105, indicative of the highest QoS grade of the DTU frames within the DTU 105. For example, if DTU frames associated with a DTU (e.g., the DTU 105) has QoS grades 0 and 1, then the highest QoS grade of the DTU 105 is 1. In some embodiments, the highest DTU tag is indicative of the highest QoS grade of the data packets associated with the DTU. In some embodiments, the highest DTU tag associated with the DTU comprises a flow control primitive (for example, DTU QoS grade tag) associated with the DTU and is predefined by the upper layers. In some embodiments, the first transceiver circuit 102 is configured to follow certain rules based on the highest DTU tag, in scheduling the transmission of the assembled DTU 105 or retransmission of the assembled DTU 105, or both.

For example, in some embodiments, in scheduling the transmission of the assembled DTU 105 or retransmission of the assembled DTU 105, or both, a DTU for retransmission with a higher highest DTU tag has priority over a DTU for retransmission with a lower highest DTU tag. Further, in some embodiments, in scheduling the transmission of the assembled DTU 105 or retransmission of the assembled DTU 105, or both, a DTU for retransmission has priority over a DTU for transmission when they both have the same highest DTU tag. Furthermore, in some embodiments, in scheduling the transmission of the assembled DTU 105 or retransmission of the assembled DTU 105, or both, a DTU identified as last chance transmission DTU for retransmission has priority over a DTU for transmission or a DTU for retransmission, irrespective of their respective highest DTU tags. In some embodiments, a DTU identified as last chance transmission DTU comprises a DTU that will be discarded as aged out if treated as per the above two rules.

Figure 3:
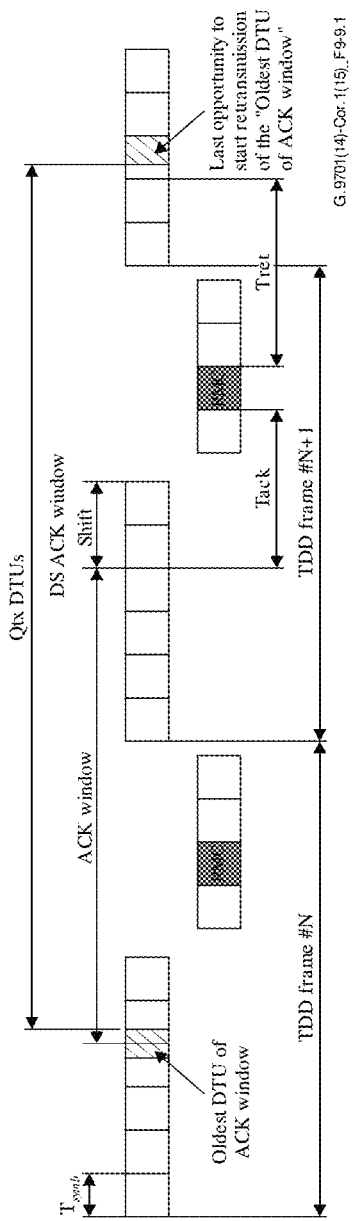
FIG. 3 depicts an illustration of a definition of $Q_{tx}$, according to one embodiment of the disclosure.

Further, in some embodiments, the DTUs assigned for retransmission and the new incoming DTUs shall be scheduled for transmission in such a way that the number of DTUs, completely mapped on data symbols and RMC symbols sent between the end of transmission of a given DTU and the start of its subsequent retransmission, does not exceed Qtx DTUs. In some embodiments, the value of Qtx is defined as the maximum number of DTUs that can be transmitted between the end of the first DTU associated with the ACK window (i.e., the oldest DTU of the ACK window) and the start of the last opportunity of this DTU retransmission associated with the given value of $T_{ret}$, as indicated in FIG. 3. In some embodiments, an upper limit on $Q_{tx}$ is the maximum number of DTUs that can be transmitted fully or partially in the relevant direction within a time period of $T_{qtx\_max}$ seconds starting from the beginning of the first (earliest in time) symbol position within the ACK window up until the end of the last symbol position in the $T_{ret}$ window.

$$T_{qtx\_max\_ds} = \left(\left\lceil \frac{T_{ack\_max\_R}}{T_{symb}} \right\rceil + \left\lceil \frac{T_{ret\_max\_O}}{T_{symb}} \right\rceil + 2 + M_F\right) * T_{symb} \quad (2)$$

$$T_{qtx\_max\_us} = \left(\left\lceil \frac{T_{ack\_max\_O}}{T_{symb}} \right\rceil + \left\lceil \frac{T_{ret\_max\_R}}{T_{symb}} \right\rceil + 2 + M_F\right) * T_{symb} \quad (3)$$

Referring back to FIG. 1 again, in some embodiments, the first transceiver circuit 102 is further configured to determine a lowest QoS grade of the QoS grades of the DTU frames in the assembled DTU 105 and associate a lowest DTU tag (TG2) with the DTU 105, indicative of the lowest QoS grade associated with the DTU frames within the DTU 105. In some embodiments, the lowest DTU tag associated with the DTU comprises a flow control primitive (for example, DTU QoS grade tag) associated with the DTU and is predefined by the upper layers. In some embodiments, the first transceiver circuit 102 is further configured to determine an age at which the assembled DTU 105 shall be discarded based on the associated lowest DTU tag. In some embodiments, determining the age at which the assembled DTU shall be discarded corresponds to determining if the assembled DTU is aged. If DTU frames associated with a DTU (e.g., the DTU 105) has QoS grades 0 and 1, then the lowest grade is 0. In some embodiments, the lowest DTU tag is indicative of the lowest QoS grade of the data packets associated with the DTU 105. In some embodiments, the age at which a DTU shall be discarded is determined based on the lowest QoS grade of the DTU frames within the DTU, in order to ensure that the DTU is not discarded before all data packets conveyed by the DTU got aged. In some embodiments, a DTU is determined to be aged when the age of the DTU is older than the delay-max associated with the lowest QoS grade associated with the DTU. Upon determining the lowest DTU tag of the assembled DTU 105, in some embodiments, the first transceiver circuit 102 is further configured to communicate the lowest DTU tag or the lowest QoS grade (provided by the lowest DTU tag) associated with the DTU 105 to the second transceiver circuit 104. In some embodiments, the first transceiver circuit 102 is configured to communicate the lowest QoS grade tag associated with the DTU 105 to the second transceiver circuit 104 in auxiliary bits of a DTU header (e.g., the DTU header 202 in FIG. 2a) associated with the DTU 105.

In some embodiments, the first transceiver circuit 102 is further configured to determine one or more DTU frames that are aged within the assembled DTU 105 and provide indication on the aged DTU frames within the DTU 105, in order to enable to communicate information on the aged DTU frames within the DTU 105 to the second transceiver circuit 104. In some embodiments, the first transceiver circuit 104 is configured to provide indication on the aged DTU frames within the DTU during a retransmission of the assembled DTU 105. In some embodiments, communicating information on the aged DTU frames within the DTU to the second transceiver circuit 104 enables the second transceiver circuit 104 to identify the aged DTU frames and drop the aged DTU frames within the DTU. In some embodiments, a DTU frame is determined as an aged DTU frame when the DTU frame is older than the value of delay_max associated with the QoS grade of this DTU frame. In some embodiments, the indication of the aged DTU frames within the DTU 105 is provided in DTU frame headers associated with the respective DTU frames.

Alternately, in other embodiments, the indication of the aged DTU frames within the DTU 105 may be provided in a DTU header (e.g., the DTU header 202 in FIG. 2a) of the DTU 105. In one example embodiment, the Auxiliary bits associated with the DTU header may be utilized to indicate the particular DTU frames inside the DTU 105 that are aged, while the entire DTU 105 is not aged. One possible way of indication of aged frames is to indicate in the auxiliary bits the QoS grade which is aged out. For instance, in on example implementation, using three auxiliary bits $A_0$, $A_1$, $A_2$, aging of all frames of the DTU 105 with QoS grades 2 could be indicated by setting $A_2=0$, while $A_0, A_1=1$. Further, when DTU frames having both QoS grades 2 and 1 are aged out, the setting could be $A_2, A_1=0, A_0=1$. In some embodiments, these settings indicate to the second transceiver circuit 104 that:
- if the DTU is received in error, it shall be NACKed for retransmission;
- if DTU is received clear, the second transceiver circuit 104 may drop immediately all the frames of the DTU that are of the added QoS grade.

In another example embodiment, in order to use smaller number of auxiliary bits, the auxiliary bits may be coded as follows:
- 00: aged frames with QoS grade 2 (while frames with QoS grades 1 or 0 are inside the DTU);
- 01: aged frames with QoS grade 1 (which means grade 2 and grade 1 are aged, but grade 0 is in DTU);
- 10: only frames of QoS grade 0 are in the DTU;
- 00: aged frames of all QoS grades (aged DTU)—in usual case this DT is not transmitted since all frames are aged.

In another example embodiment, the Auxiliary bits may be coded as follows:
- 00: frames with QoS grades 0, 1, 2 are present;
- 01: only frames with QoS grades 0, 1 are present;
- 10: only frames with QoS grades 1, 2 are present;
- 11: only frames with QoS grade 0 are present.

The above set doesn't include the case "only frames with QoS grade 2 are present", which is rather rare because frames of QoS grade 2 are usually rare and short. However, in other embodiments, with bigger number of auxiliary bits (e.g., 3 bits) this case can be added, together with other cases, if needed.

In some embodiments, the QoS grades associated with the various DTU frames and the indication of the aged DTU frames are provided as different DTU frame types within the respective DTU frame headers as given in Table 1 below.

TABLE 1

DTU frame type and coding

| DTU frame type | Coding [$t_3t_2t_1t_0$] | Header extension | Valid length (bytes) (Note) |
|---|---|---|---|
| Idle | 0000 | No | N/A |
| Complete data packet of QoS grade 0 | 1110 | Yes | 1-4039 |
| Complete data packet of QoS grade 1 | 0110 | Yes | 1-4039 |
| Complete data packet of QoS grade 2 | 0111 | Yes | 1-4039 |
| Complete eoc packet | 1111 | Yes | 1-4039 |
| Start of data packet of QoS grade 0 | 1100 | Yes | 1-4039 |
| Start of data packet of QoS grade 1 | 0100 | Yes | 1-4039 |
| Start of data packet of QoS grade 2 | 0101 | Yes | 1-4039 |
| Start of eoc packet | 1101 | Yes | 1-4039 |
| Continuation of the packet of QoS grade 0 (data or eoc) | 1000 | Yes | 1-4039 |
| Continuation of the packet of QoS grade 1 | 0010 | Yes | 1-4039 |
| Continuation of the packet of QoS grade 2 | 0011 | Yes | 1-4039 |
| End of the packet of QoS grade 0 (data or eoc) | 1010 | Yes | 1-4039 |
| End of data packet of QoS grade 1 | 1011 | Yes | 1-4039 |
| End of data packet of QoS grade 2 | 1001 | Yes | 1-4039 |
| Aged DTU frame | 0001 | Yes | 1-4039 |

As can be seen in Table 1, different DTU frame types are defined, for example, a complete data packet DTU frame, a complete eoc packet data frame, start of data packet (SP), start of eoc packet (SEP), continuation of packet (CP), end of packet (EP), idle DTU frame, aged DTU frame etc. In some embodiments, an idle DTU frame shall only be used as the last frame of the DTU payload, with the length equal to the number of remaining bytes of the DTU payload. The payload of an idle DTU frame is vendor discretionary. An idle DTU frame may follow any other type of DTU frame in the DTU payload. If no other DTU frame type is available for the DTU payload, an idle DTU frame shall be the only frame of the DTU payload. The payload of a complete data packet DTU frame shall consist of the original user data packet. The payload of a complete eoc packet DTU frame shall consist of an eoc packet. If the original user data packet or eoc packet is bigger than the remaining space available in the given DTU payload or bigger than a payload of the entire DTU, it shall be spread over several DTUs using the following DTU frame types:
- start of data/eoc packet, followed by
- one or more continuation of this packet, followed by
- end of this packet.

Figure 2E:
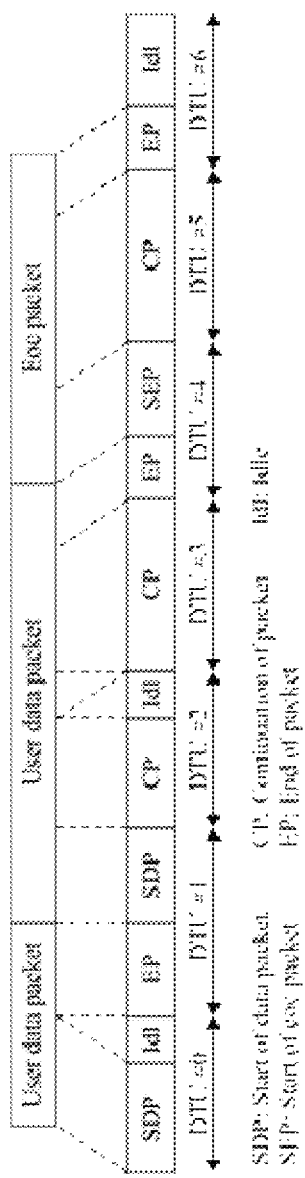
FIG. 2e illustrates an example mapping of data packets between DTUs for transmission, according to one embodiment of the disclosure.

An example mapping of data packets between DTUs for transmission, is given in FIG. 2e. Data packets that are longer than a single DTU are transmitted in parts; the first part shall be transmitted in a start of data packet DTU frame, followed by zero, one or more continuation of the packet DTU frames, followed by an end of the packet DTU frame. The same applies for eoc packets. In some embodiments, a last DTU frame or a DTU frame preceding an idle DTU frame in the DTU payload may include a part of a data or eoc packet, for example, a start of data packet DTU frame or start of eoc packet DTU frame or continuation of the packet DTU frame. If used, a first frame of the next DTU payload will be a continuation of the packet DTU frame, or an end of the packet DTU frame, or an idle DTU frame. The aged DTU frame type in Table 1 signifies that the DTU frame is older than the value of delay_max associated with the QoS grade of this DTU frame.

Referring back to FIG. 1, in some embodiments, the second transceiver circuit 104 is configured to receive the assembled DTU 105 from the first transceiver circuit 102. Upon receiving the assembled DTU 105, the second transceiver circuit 104 may be configured to sort or reorder the data packets based on the QoS grades indicated within the DTU frame headers of the DTU frames within the assembled DTU 105. In some embodiments, the second transceiver circuit 104 is further configured to determine an age at which the DTU 105 shall be discarded, based on information of a lowest DTU tag (or the lowest QoS grade) associated with the DTU 105, provided within the DTU 105. In some embodiments, the age of the DTU 105 shall be computed in symbol periods, as the difference between the symbol count at which the symbol carrying the first bit of the DTU 105 appears at an interface of the second transceiver circuit 104 and the time stamp (TS) value of this DTU. In some embodiments, the DTU 105 is determined to be aged when the age of the DTU 105 is older than the delay_max associated with the lowest QoS grade of the DTU105. In some embodiments, the value of delay_max associated with the various QoS grades are assumed to be known at the second transceiver circuit 104 (e.g., provided during initialization). In some embodiments, the second transceiver circuit 104 is further configured to discard or drop the DTU 105, when the DTU 105 is determined to be aged.

Alternately, in some embodiments, the second transceiver circuit 104 may be configured to pass the data packets from DTU frames with high QoS grades forward to the layer 2 at the time the DTU 105 gets aged instead of discarding them as DTU 105 is discarded. The reason is that the sequence number is associated with the DTU, but not with DTU frames and therefore it can happen e.g. that QoS grade 0 & 1 DTU frames are in the RX queue waiting for re-ordering but all missing DTUs in sequence contain only grade 0 DTU frames. The receiver knows this only at the point of time when getting the missed DTU and at this point of time, the QoS grade 1 DTU frames in the RX queue are probably aged. So, if not applied, the QoS grade 1 DTU frames in the RX queue would be discarded in this example although they are not subject of re-ordering anymore. For example, in one example embodiment, suppose there are 10 DTUs on the line with following SIDs in sequence 1, 2, 3, 4, 5, 6, 7, 8, 2, 9 and one DTU per symbol. This happened because the $2^{nd}$ DTU got corrupted and was retransmitted as $9^{th}$ DTU. This $2^{nd}$ DTU contains only grade 0 DTU frames but the receiver doesn't know this since it got corrupted. The $3^{rd}$ to $8^{th}$ DTUs contain grade 0 frames and grade 1 frames. If the maximum permitted delay delay_max is 5 symbols for grade 1 and 20 symbols for grade 0 then the grade 1 frames of the $3^{rd}$, $4^{th}$, $5^{th}$, $6^{th}$ and $7^{th}$ DTU should be passed to the next higher sub-layer with the reception of the $7^{th}$ DTU. In such embodiments, there will be no error since grade 1 specific reordering don't need to wait on the $2^{nd}$ DTU.

In some embodiments, the second transceiver circuit 104 is further configured to determine one or more aged DTU frames within the received DTU 105. In some embodiments, the second transceiver circuit 104 is configured to determine one or more aged DTU frames within the received DTU 105, based on an indication of aged DTU frames, provided within the DTU 105 (e.g., in the respective DTU frame headers). Alternately, in other embodiments, the second transceiver circuit 104 is configured to determine one or more aged DTU frames within the received DTU, based on information of QoS grade tags associated with the DTU frames of the DTU 105, provided within the DTU 105 (e.g., in the respective DTU frame headers). In some embodiments, the age of the DTU frame shall be computed in symbol periods, as the difference between the symbol count at which the symbol carrying the first bit of the DTU containing the DTU frame appears at an interface of the second transceiver circuit 104 and the TS value of this DTU. In such embodiments, a DTU frame within a DTU is determined to be aged when the age of the DTU frame is older than the delay_max associated with the QoS grade tag of the respective DTU frame. Upon determining the aged DTU frames within the DTU 105, in some embodiments, the second transceiver circuit 104 is configured to discard or drop the aged DTU frames.

Figure 4:
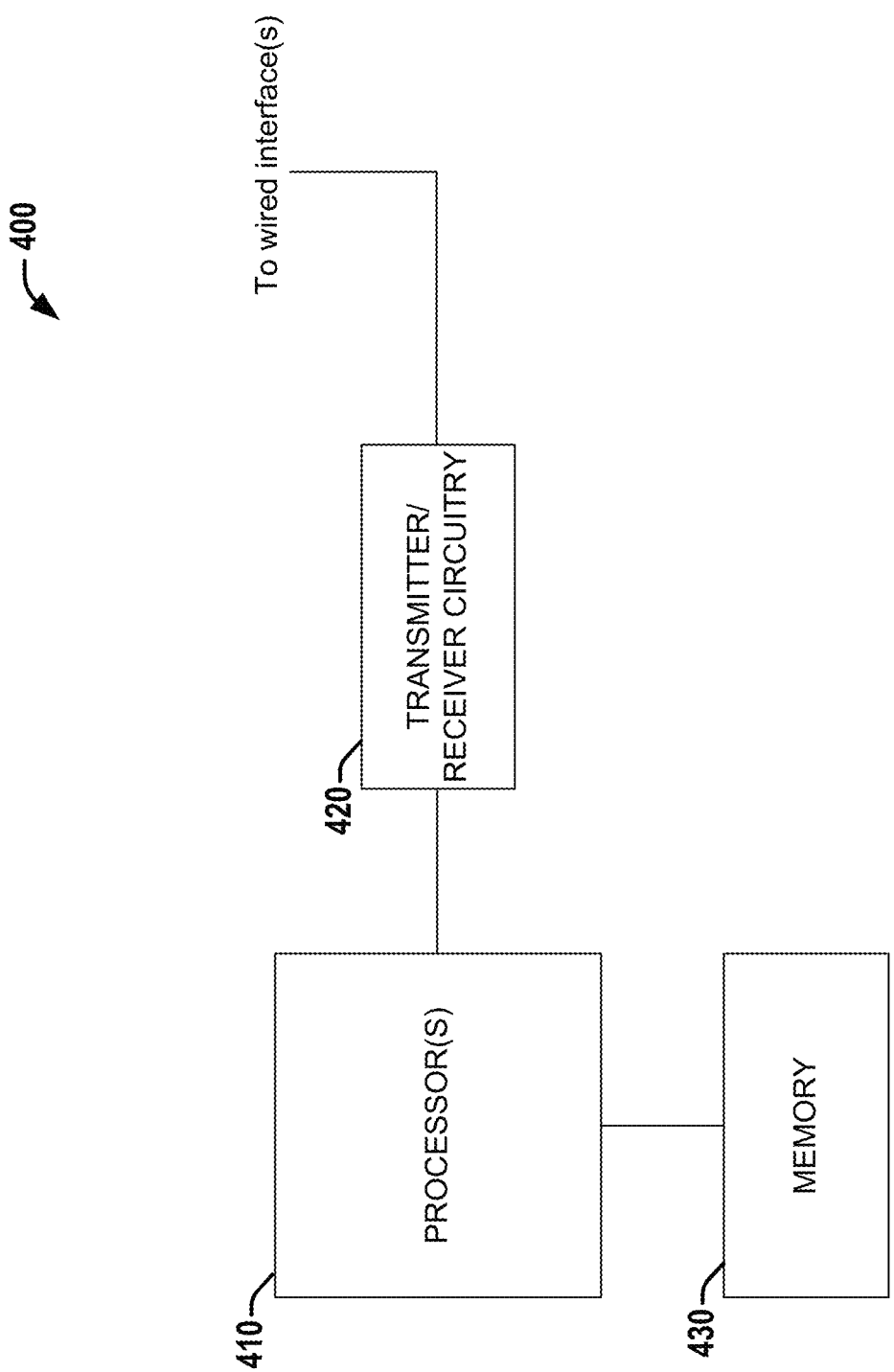
FIG. 4 illustrates a simplified block diagram of an apparatus for use in a transceiver circuit associated with a wireline communication system, according to one embodiment of the disclosure.

FIG. 4 illustrates a simplified block diagram of an apparatus 400 for use in a transceiver circuit associated with a wireline communication system, according to various embodiments described herein. In some embodiments, the apparatus 400 facilitates to schedule a transmission or retransmission of data transfer units (DTUs) based on a differentiation between QoS grades. In some embodiments, the apparatus 400 could be included within the first transceiver circuit 102 in FIG. 1. Therefore, the apparatus 400 is explained herein with reference to the first transceiver circuit 102 in FIG. 1. However, in other embodiments, the apparatus can be explained with reference to any transceiver circuit associated with a wireline communication system. The apparatus 400 includes a processing circuit 410, a transmitter/receiver circuit 420 (which can facilitate communication of data via one or more networks in some aspects) and a memory circuit 430 (which can comprise any of a variety of storage mediums and can store instructions and/or data associated with at least one of the processor 410 or transmitter/receiver circuitry 420). In some embodiments, the transmitter/receiver circuit 420 may include, inter alia, down-mixers, filters, and A/D converters to convert the high frequency upstream communication to digital data, such as baseband data for example. Further, in some embodiments, the transmitter/receiver circuit 420 may include, inter alia, up-mixers, filters, and D/A converters to convert digital data, such as baseband data for example, to high frequency downstream communication. In some embodiments, the processing circuit 410 may be configured to perform all the functions (or more) of the transceiver circuit 800 given in FIG. 8 below.

In one embodiment, the transmitter/receiver circuitry 420 can comprise a receiver circuit and a transmitter circuit. In some embodiments, the processing circuit 410 can include one or more processors. In some embodiments, the memory circuit 430 comprises a computer readable storage device that includes instructions to be executed by the processor 410. In some embodiments, the memory circuit 430 can be an independent circuit and in other embodiments, the memory circuit 430 can be integrated on chip with the processor 410. Alternately, in other embodiments, the instructions to be executed by the processor 410 can be stored on a non-transitory storage medium like ROM, flash drive etc., and can be downloaded to the memory circuit 430 for execution. In some embodiments, the memory circuit 330 can comprise one or more memory circuits. In some embodiments, the one or more memory circuits can be integrated on a single chip. However, in other embodiments, the one or more memory circuits can be embedded on different chips. As described in greater detail below, apparatus 400 can facilitate retransmission of data transfer units (DTUs) based on a differentiation between QoS grades.

In some embodiments, the processing circuit 410 is configured to receive a plurality of data packets to be transmitted. In some embodiments, the processing circuit 410 may be configured to receive the plurality of data packets from an external interface, for example, a peer transceiver. Upon receiving the plurality of data packets, the processing circuit 410 is further configured to associate a quality of service (QoS) grade tag to each data packet of the plurality of data packets to be transmitted. In some embodiments, the QoS grade tag is indicative of or comprises a QoS grade of the respective data packets, the details of which are explained above with respect to FIG. 1. In some embodiments, the processing circuit is further configured to assemble a data transfer unit (DTU) (e.g., the DTU 105 in FIG. 1 or DTU 200 in FIG. 2*a*) comprising one or more or a part of a data packet of the plurality of data packets. In some embodiments, the processing circuit 410 is further configured to provide the DTU to the transmitter/receiver circuit 420, for subsequent transmission to a peer transceiver circuit (e.g., the second transceiver circuit 104 in FIG. 1).

In assembling the DTU, in some embodiments, the processing circuit 410 is configured to encapsulate the one or more or the part of the data packet into a plurality of DTU frames (e.g., the DTU frames 204*a*, 204*b* etc. in FIG. 2*c*) within the DTU. In some embodiments, each DTU frame of the plurality of DTU frames is associated with the QoS grade of a data packet or a part of the data packet encapsulated within the respective DTU frame. In some embodiments, the processing circuit 410 is further configured to provide an indication of the QoS grades associated with the DTU frames in DTU frame headers (e.g., the DTU frame headers 205 in FIG. 2*c*) associated with the respective DTU frames. In some embodiments, the processing circuit 410 is configured to provide the indication of the QoS grades associated with the DTU frames as DTU frame types in DTU frame headers. However, in other embodiments, the processing circuit 410 may be configured to provide the indication of the QoS grades associated with the DTU frames in a field different from the DTU frame type field, within the DTU frame headers. Alternately, in some embodiments, the processing circuit 410 may be configured to provide the indication of the QoS grade tags associated with the DTU frames in the DTU header (e.g., the DTU header 202 in FIG. 2*a*) of the DTU.

In some embodiments, the processing circuit 410 is further configured to determine a schedule for transmission of the assembled DTU or retransmission of the assembled DTU, or both, based on the QoS grades associated with the DTU frames within the assembled DTU. In some embodiments, in order to determine the schedule for transmission of the assembled DTU or retransmission of the assembled DTU, or both, the processing circuit 410 is configured to determine a highest QoS grade associated with the DTU frames within the assembled DTU and associate a highest DTU tag (TG1) with the DTU, indicative of the highest QoS grade of the DTU frames within the DTU, as explained above with respect to FIG. 1.

Upon associating the highest DTU tag associated with the DTU, the processing circuit 410 is further configured to schedule the transmission of the assembled DTU or retransmission of the assembled DTU, or both, based on the highest DTU tag. In some embodiments, the processing circuit 410 is configured to follow certain rules for the scheduling the transmission or retransmission of the DTU. For example, in some embodiments, in scheduling the transmission or retransmission of the assembled DTU, a DTU for retransmission with a higher highest DTU tag has priority over a DTU for retransmission with a lower highest DTU tag. Further, in some embodiments, in scheduling the transmission or retransmission of the assembled DTU, a DTU for retransmission has priority over a DTU for transmission when they both have the same highest DTU tag. Furthermore, in some embodiments, in scheduling the transmission or retransmission of the assembled DTU, a DTU identified as last chance transmission DTU for retransmission has priority over a DTU for transmission or a DTU for retransmission, irrespective of their respective highest DTU tags. In some embodiments, the processing circuit 410 is configured to schedule the transmission of the assembled DTU or retransmission of the assembled DTU, or both, based on instructions stored in the memory circuit 430.

In some embodiments, the processing circuit 410 is further configured to determine a lowest QoS grade of the QoS grades of the DTU frames in the assembled DTU 105 and associate a lowest DTU tag with the DTU, indicative of the lowest QoS grade associated with the DTU frames within the DTU, as explained above with respect to FIG. 1. In some embodiments, the processing circuit 410 is further configured to determine an age at which the assembled DTU shall be discarded based on the associated lowest DTU tag. In some embodiments, the processing circuit 410 is further configured to discard the assembled DTU when the assembled DTU is determined to be aged. In some embodiments, the DTU is determined to be aged when the age of the DTU is older than the delay_max associated with the lowest QoS grade of the DTU, as explained above with respect to FIG. 1. In some embodiments, the processing circuit 410 is further configured to provide an indication of the lowest DTU tag (or the lowest QoS grade) associated with the DTU in a DTU header (e.g., the DTU header 202 in FIG. 2*a*) associated with the DTU.

In some embodiments, the processing circuit 410 is further configured to determine one or more aged DTU frames of the DTU and provide an indication of the one or more aged DTU frames within the DTU. In some embodiments, the processing circuit 410 is configured to provide the indication of the one or more aged DTU frames within the DTU, during a retransmission of the DTU. In some embodiments, the processing circuit 410 is configured to provide the indication of the one or more aged DTU frames, in a DTU header associated with the DTU. Alternately, in other embodiments, the processing circuit 410 may be configured to provide the indication of the one or more aged DTU frames, in DTU frame headers associated with the respective aged DTU frames. In some embodiments, a DTU frame within a DTU is determined to be aged when the age of the DTU frame is older than the delay_max associated with the QoS grade of the respective DTU frame.

Figure 5:
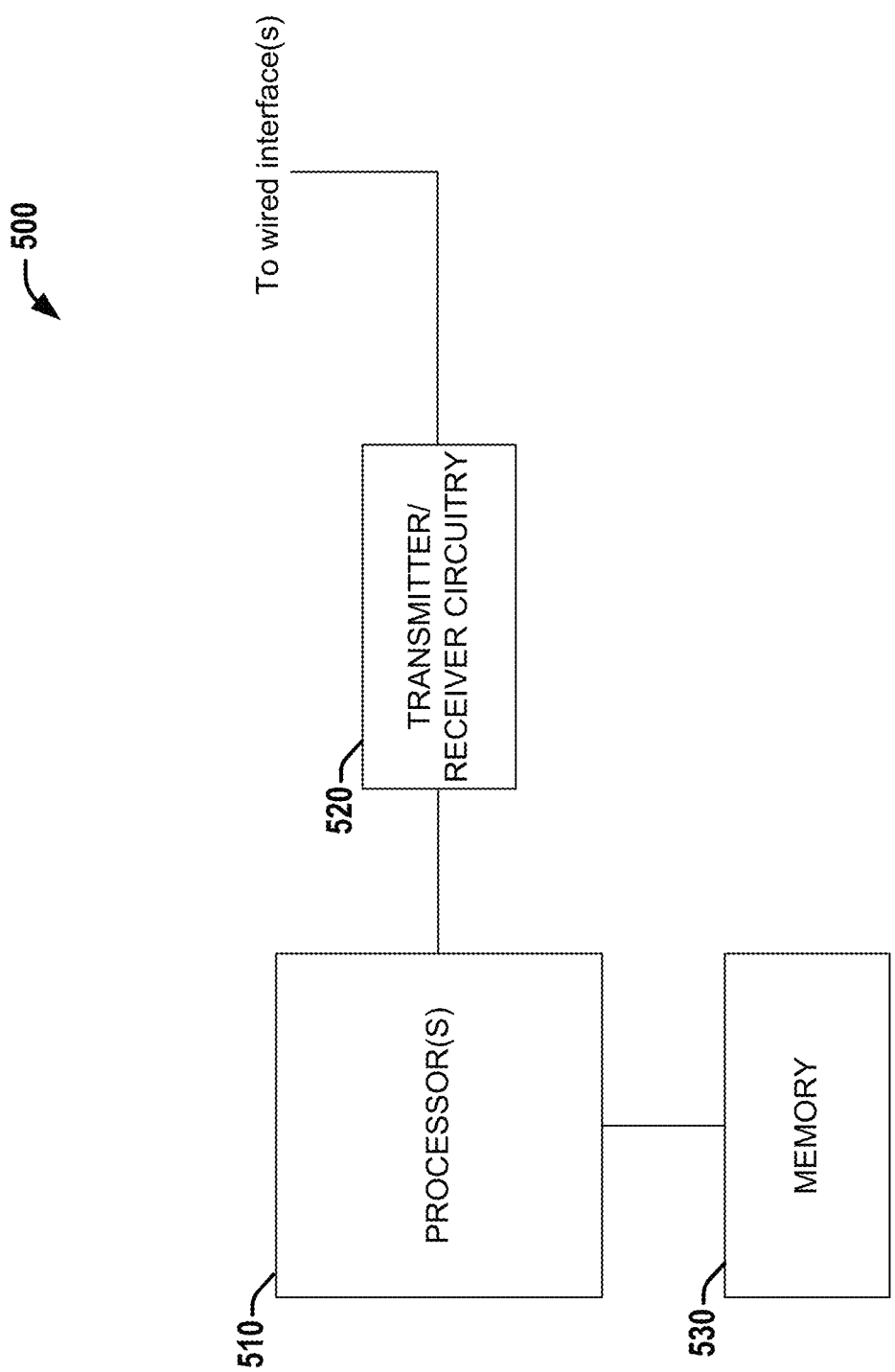
FIG. 5 illustrates a simplified block diagram of an apparatus for use in a transceiver circuit associated with a wireline communication system, according to another embodiment of the disclosure.

FIG. 5 illustrates a simplified block diagram of an apparatus 500 for use in a transceiver circuit associated with a wireline communication system, according to various embodiments described herein. In some embodiments, the apparatus 500 facilitates to process data transfer units (DTUs) received from a peer transceiver based on QoS grades. In some embodiments, the apparatus 500 could be included within the second transceiver circuit 104 in FIG. 1. Therefore, the apparatus 500 is explained herein with reference to the first transceiver circuit 104 in FIG. 1. However, in other embodiments, the apparatus can be explained with reference to any transceiver circuit configured to receive a DTU associated with a wireline communication system. The apparatus 500 includes a processing circuit 510, a transmitter/receiver circuit 520 (which can facilitate communication of data via one or more networks in some aspects) and a memory circuit 530 (which can comprise any of a variety of storage mediums and can store instructions and/or data associated with at least one of the processor 510 or transmitter/receiver circuitry 520). In some embodiments, the transmitter/receiver circuit 520 may include, inter alia, down-mixers, filters, and A/D converters to convert the high frequency upstream communication to digital data, such as baseband data for example. Further, in some embodiments, the transmitter/receiver circuit 520 may include, inter alia, up-mixers, filters, and D/A converters to convert digital data, such as baseband data for example, to high frequency downstream communication. In some embodiments, the processing circuit 510 may be configured to perform all the functions (or more) of the transceiver circuit 900 given in FIG. 9 below.

In one embodiment, the transmitter/receiver circuitry 520 can comprise a receiver circuit and a transmitter circuit. In some embodiments, the processing circuit 510 can include one or more processors. In some embodiments, the memory circuit 530 comprises a computer readable storage device that includes instructions to be executed by the processor 510. In some embodiments, the memory circuit 530 can be an independent circuit and in other embodiments, the memory circuit 530 can be integrated on chip with the processor 510. Alternately, in other embodiments, the instructions to be executed by the processor 510 can be stored on a non-transitory storage medium like ROM, flash drive etc., and can be downloaded to the memory circuit 530 for execution. In some embodiments, the memory circuit 330 can comprise one or more memory circuits. In some embodiments, the one or more memory circuits can be integrated on a single chip. However, in other embodiments, the one or more memory circuits can be embedded on different chips. As described in greater detail below, apparatus 500 can facilitates to process data transfer units (DTUs) based on QoS grades associated with the data packets encapsulated within.

In some embodiments, the processing circuit is configured to receive an assembled DTU (e.g., the assembled DTU 105 in FIG. 1) from a peer transceiver circuit (e.g., the first transceiver circuit 102 in FIG. 1), via the transmitter/receiver circuit 520. Upon receiving the assembled DTU, in some embodiments, the processing circuit 510 is configured to sort or reorder the data packets within the DTU, based on the QoS grades indicated within the DTU frame headers of the DTU frames within the assembled DTU, in accordance with instructions stored in the memory circuit 530. In some embodiments, the processing circuit 510 is further configured to determine an age at which the DTU shall be discarded, based on information of a lowest QoS grade associated with the DTU, provided within the DTU (e.g., in the respective DTU header). In some embodiments, the age of the DTU may be computed at the processing circuit 510 in symbol periods, as the difference between the symbol count at which the symbol carrying the first bit of the DTU appears at an interface of the second transceiver circuit 104 and the time stamp (TS) value of this DTU. In some embodiments, the DTU is determined to be aged at the processing circuit 510, when the age of the DTU is older than the delay_max associated with the lowest QoS grade of the DTU. In some embodiments, information on the delay-max associated with the lowest QoS grade and the instructions for determining an aged DTU may be stored in the memory circuit 520. In some embodiments, the processing circuit 510 is further configured to discard or drop the DTU, when the DTU is determined to be aged.

Alternately, in some embodiments, the processing circuit 510 may be configured to pass the data packets from DTU frames with high QoS grades forward to the layer 2 at the time the DTU (e.g., the DTU105) gets aged instead of discarding them as DTU is discarded. In some embodiments, the second transceiver circuit 104 is further configured to determine one or more aged DTU frames within the received DTU. In some embodiments, the processing circuit 510 is configured to determine one or more aged DTU frames within the received DTU (e.g., the assembled DTU 105 in FIG. 1), based on an indication of aged DTU frames, provided within the DTU. Alternately, in other embodiments, the processing circuit 510 may be configured to determine one or more aged DTU frames within the received DTU, based on information of QoS grades associated with the DTU frames of the DTU, provided within the DTU. In such embodiments, the processing circuit 510 is configured to determine one or more aged DTU frames by determining the age of the DTU frames based on the QoS grades associated with the respective DTU frames. In some embodiments, the age of the DTU frame shall be computed in symbol periods at the processing circuit 510, as the difference between the symbol count at which the symbol carrying the first bit of the DTU containing the DTU frame appears at an interface of the second transceiver circuit 104 and the TS value of this DTU. In some embodiments, a DTU frame within a DTU is determined to be aged, at the processing circuit 510, when the age of the DTU frame is older than the delay_max associated with the QoS grade of the respective DTU frame. Upon determining the aged DTU frames within the DTU, in some embodiments, the processing circuit 510 is further configured to discard or drop the aged DTU frames.

Figure 6:
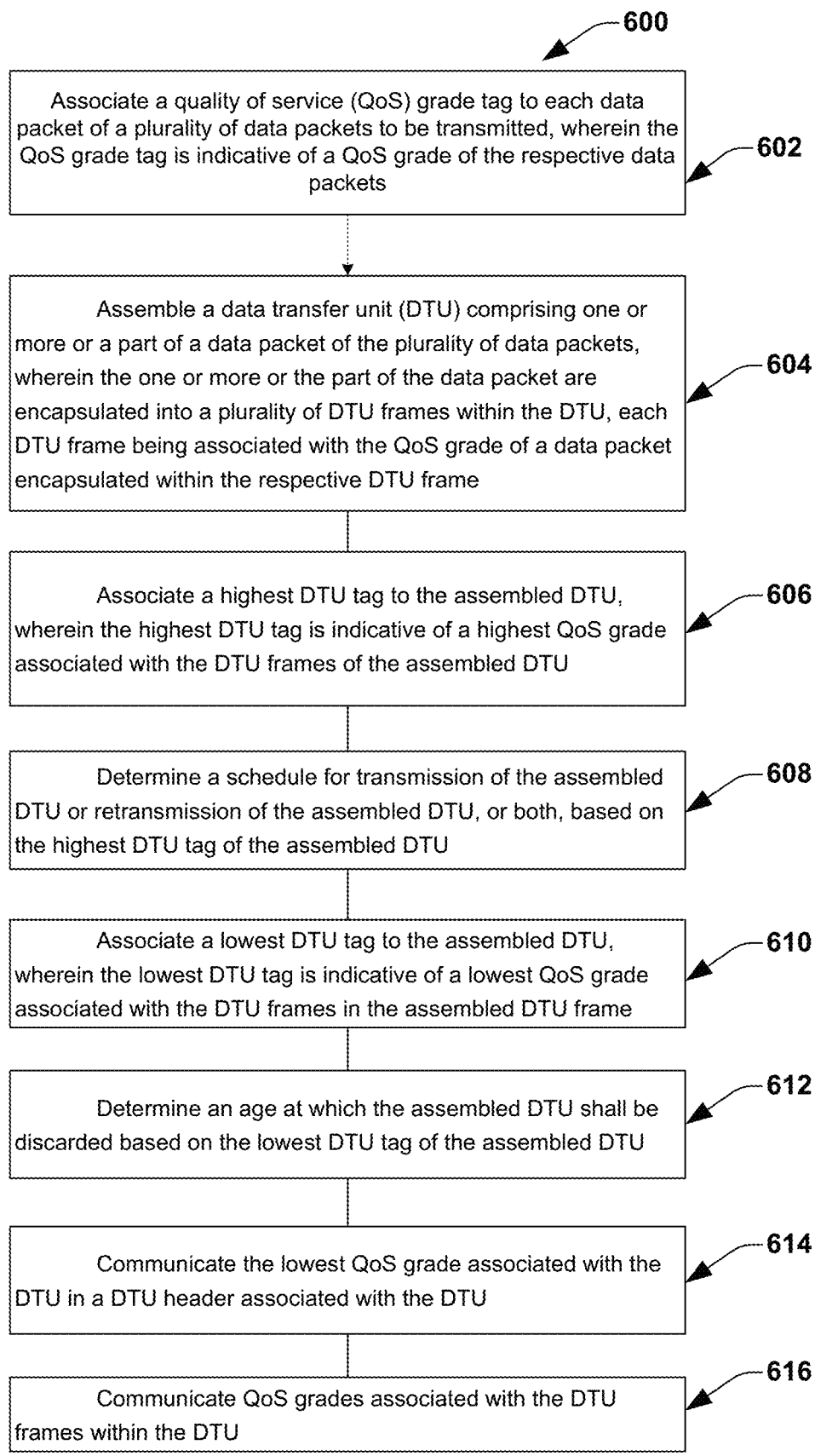
FIG. 6 illustrates a flow chart of a method for a transceiver in a wireline communication system, according to one embodiment of the disclosure.

FIG. 6 illustrates a flow chart of a method 600 for a transceiver in a wireline communication system, according to one embodiment of the disclosure. The method 600 is explained herein with reference to the apparatus 400 in FIG. 4. In some embodiments, the apparatus 400 could be included within the first transceiver circuit 102 in FIG. 1. At 602, a quality of service (QoS) grade tag is associated to each data packet of a plurality of data packets to be transmitted, at the processing circuit 410. In some embodiments, the QoS grade tag is indicative of a QoS grade of the respective data packets. At 604, a data transfer unit (DTU) (e.g., the DTU 105 in FIG. 1) comprising one or more or a part of a data packet of the plurality of data packets is assembled at the processing circuit 410. In some embodiments, the one or more or the part of the data packet are encapsulated into a plurality of DTU frames within the DTU, each DTU frame being associated with the QoS grade of a data packet encapsulated within the respective DTU frame.

At 606, a highest DTU tag is associated to the assembled DTU, at the processing circuit 410. In some embodiments, the highest DTU tag is indicative of a highest QoS grade associated with the DTU frames of the assembled DTU. At 608, a schedule for transmission of the assembled DTU or retransmission of the assembled DTU, or both, is determined at the processing circuit 410, based on the highest DTU tag of the assembled DTU, in accordance with the instructions stored in the memory circuit 430. For example, in some embodiments, in scheduling the transmission or retransmission of the assembled DTU, a DTU for retransmission with a higher highest DTU tag has priority over a DTU for retransmission with a lower highest DTU tag. Further, in some embodiments, in scheduling the transmission or retransmission of the assembled DTU, a DTU for retransmission has priority over a DTU for transmission when they both have the same highest DTU tag. Furthermore, in some embodiments, in scheduling the transmission or retransmission of the assembled DTU, a DTU identified as last chance transmission DTU for retransmission has priority over a DTU for transmission or a DTU for retransmission, irrespective of their respective highest DTU tags At 610, a lowest DTU tag is associated to the assembled DTU, at the processing circuit 410. In some embodiments, the lowest DTU tag is indicative of a lowest QoS grade associated with the DTU frames in the assembled DTU. At 612, an age at which the assembled DTU shall be discarded is determined at the processing circuit 410, based on the lowest DTU tag of the assembled DTU, in accordance with the instructions stored in the memory circuit 430. At 614, the lowest QoS grade associated with the DTU is communicated by the processing circuit 410, in a DTU header associated with the DTU. In some embodiments, communicating the lowest QoS grade associated with the DTU enables a peer transceiver (e.g., the second transceiver circuit 104 in FIG. 1) to determine the age at which the DTU shall be discarded. At 616, QoS grades associated with the DTU frames is communicated by the processing circuit 410, within the DTU. In some embodiments, an indication of one or more aged DTU frames of the DTU are provided by the processing circuit 410, within the DTU, as explained above with respect to FIG. 4.

Figure 7:
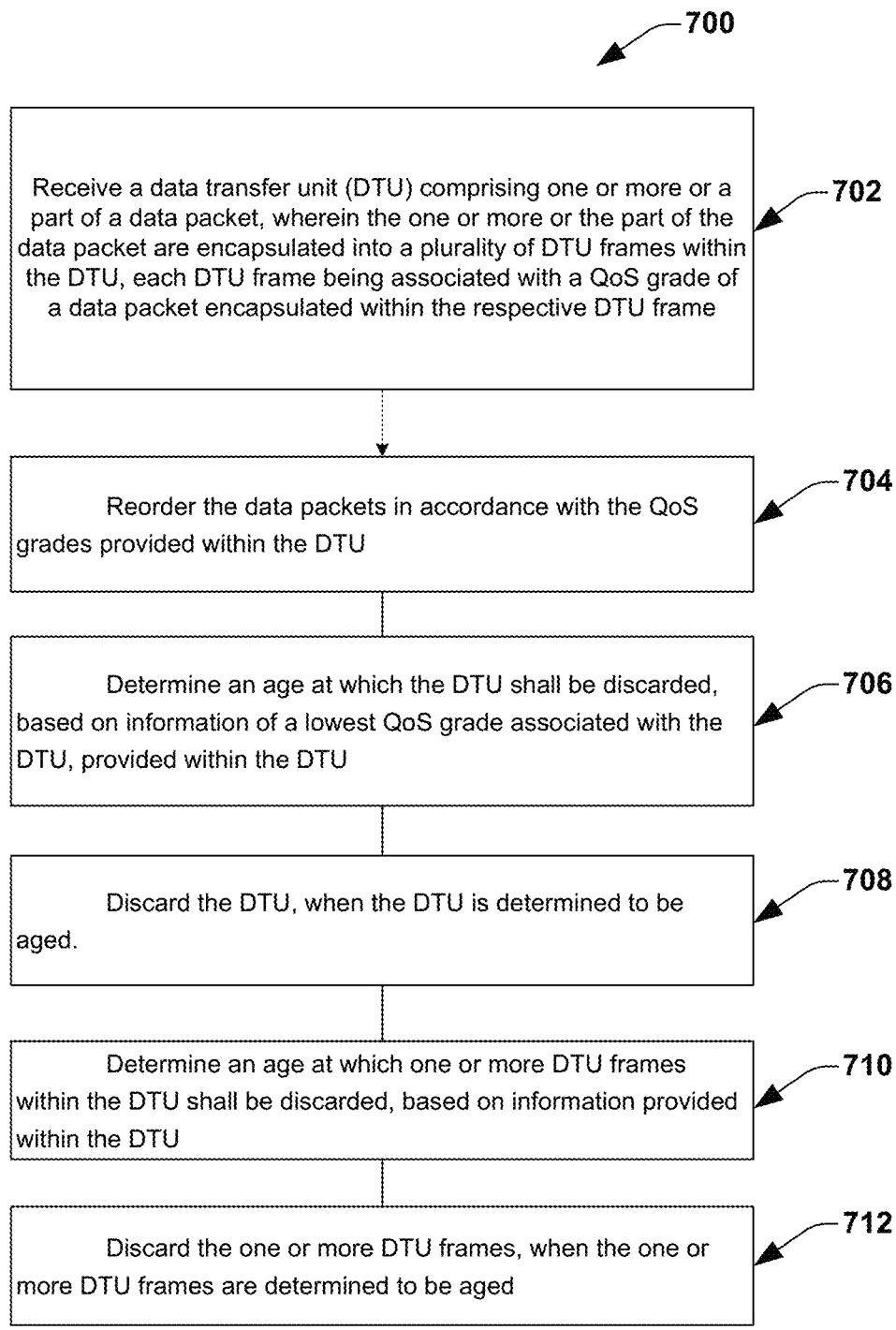
FIG. 7 illustrates a flow chart of a method for a transceiver in a wireline communication system, according to another embodiment of the disclosure.

FIG. 7 illustrates a flow chart of a method 700 for a transceiver in a wireline communication system, according to one embodiment of the disclosure. The method 700 is explained herein with reference to the apparatus 500 in FIG. 5. In some embodiments, the apparatus 700 could be included within the second transceiver circuit 104 in FIG. 1. At 702, a data transfer unit (DTU) (e.g., the DTU 105 in FIG. 1) comprising one or more or a part of a data packet, is received at the processing circuit 510. In some embodiments, the one or more or the part of the data packet are encapsulated into a plurality of DTU frames within the DTU. In some embodiments, each DTU frame is associated with a QoS grade of a data packet encapsulated within the respective DTU frame and the information of the QoS grade of each of the DTU frames is provided within the DTU. At 704, the data packets within the received DTU are reordered at the processing circuit 510, in accordance with the QoS grades provided within the DTU.

At 706, an age at which the DTU shall be discarded, is determined at the processing circuit 510, based on information of a lowest QoS grade associated with the DTU, provided within the DTU. At 708, the DTU is discarded by the processing circuit 510, when the DTU is determined to be aged. At 710, an age at which one or more DTU frames within the DTU shall be discarded, is determined at the processing circuit 510, based on information provided within the DTU. In some embodiments, an age at which one or more DTU frames within the DTU shall be discarded, is determined at the processing circuit 510, based on the QoS grades of the one or more DTU frames provided within the DTU. In some embodiments, an age at which one or more DTU frames within the DTU shall be discarded, is determined at the processing circuit 510, based on an indication of one or more aged DTU frames provided within the DTU. At 710, the one or more DTU frames are discarded by the processing circuit 510, when the one or more DTU frames are determined to be aged.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 8:
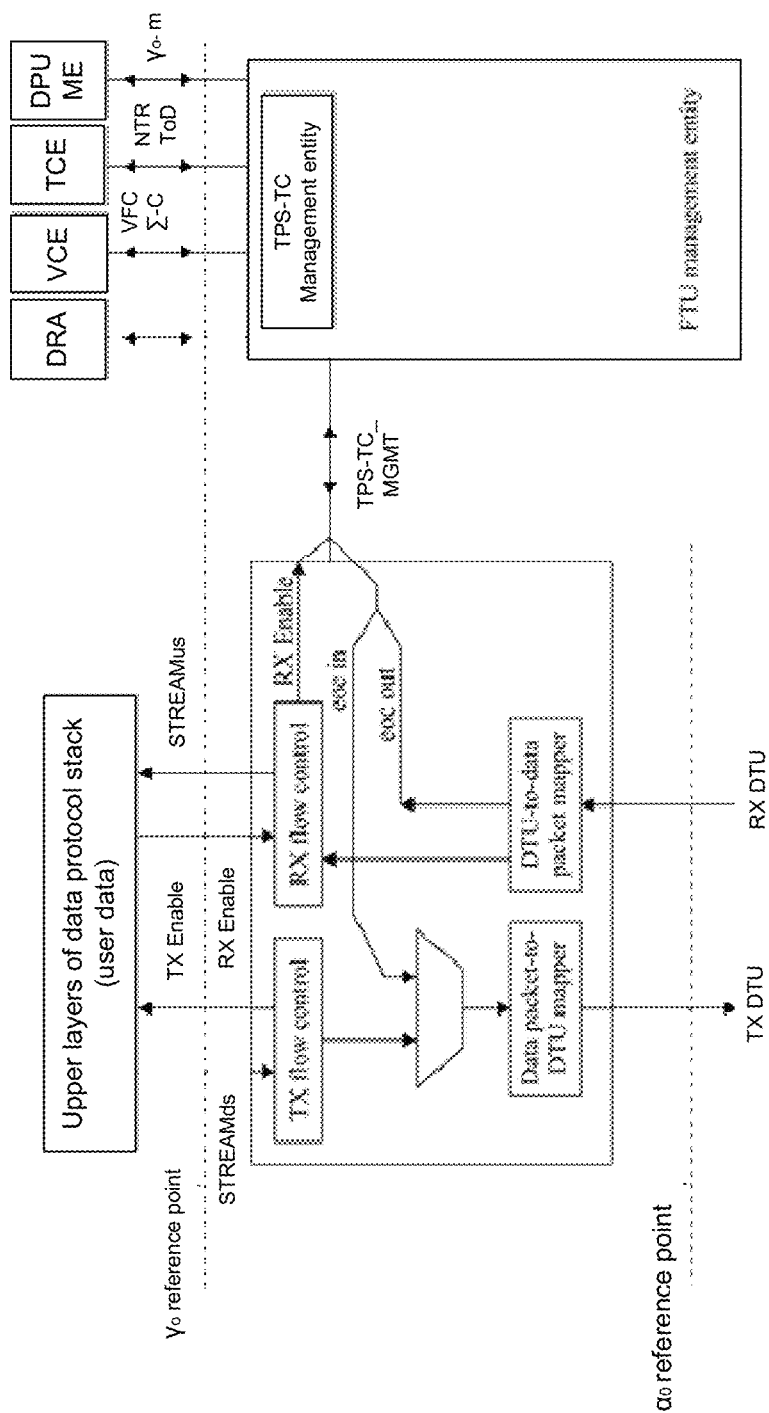
FIG. 8 illustrates a functional reference model of a transceiver circuit, according to various embodiments described herein.

FIG. 8 illustrates a functional reference model of a transceiver circuit 800, according to various embodiments described herein. In some embodiments, the transceiver circuit 800 complies with a fast transceiver unit (FTU) defined in the recommendation ITU-T G.9701 and has all the features defined in the recommendation ITU-T G.9701. In particular, the transceiver circuit 800 comprises an FTU at optical network unit (FTU-O) defined in ITU-T G.9701. In some embodiments, the functional reference model of the transceiver circuit 800 is applicable to the first transceiver circuit 102 in FIG. 1. The FTU functional reference model comprises a transport protocol specific transmission convergence (TPS-TC) sub-layer that resides between γ and α reference points, and the physical media specific part of the transmission convergence (PMS-TC) sub-layer and the physical media dependent (PMD) sub-layer, which reside between α and U reference points.

In some embodiments, in the transmit direction, the data packets (STREAMds) crossing the γ reference point are encapsulated into data transfer units (DTUs) that are passed to the physical media specific transmission convergence (PMS-TC) sublayer across the $\alpha_O$ reference point. In some embodiments, STREAMds corresponds to the plurality of data packets referred with respect to FIG. 1 above. In some embodiments, the data packets comprising STREAMds may belong to services with particular QoS requirements and are transferred across the γ reference point with a tag (e.g., TX QoS grade tag) associated with the respective QoS grade. The flow control primitives at the $\gamma_O$ reference point of the FTU-O transceiver is given in Table 2 below:

TABLE 2

Flow control primitives at the γ reference point

| Primitive | Direction | Description |
|---|---|---|
| RX Enable | Upper layer → TPS-TC | Flow control primitive indicating that the upper layer is ready to receive packets from the TPS-TC; valid at the FTU-O only (Note 1, Note 3). |
| TX Start Flag | | Indicates the first byte of the packet transmitted towards the TPS-TC. |
| TX QoS grade tag | | Indicates the QoS grade associated with the packet transmitted towards the TPS-TC. |
| TX Stop Flag | | Indicates the last byte of the packet transmitted towards the TPS-TC. |
| TX Clock | | Transmit data clock reference. |
| TX Enable | TPS-TC → Upper layer | Flow control primitive indicating that the TPS-TC is ready to receive the next packet from the upper layer (Note 2). |
| RX Start Flag | | Indicates the first byte of the packet transmitted by the TPS-TC towards the upper layer. |
| RX Stop Flag | | Indicates the last byte of the packet transmitted by the TPS-TC towards the upper layer. |
| RX Clock | Upper layer → TPS-TC | Receive data clock reference. |

(Note 1) -
If the RX Enable primitive is turned off during the transfer of a data packet, the FTU-O shall complete the transfer of this data packet.
(Note 2) -
If the TX Enable primitive is turned off during the transfer of a data packet, the upper layer shall complete the transfer of this data packet.
(Note 3) -
At the FTU-R, primitive TX Enable also implements the remote flow control determined by the RX Enable primitive at the FTU-O. The setting of the RX Enable primitive (Rxon/Rxoff) is communicated via the RMC. The status of the primitive may change from one logical frame to the next.

The QoS grades are from 0 (lowest grade) to 2 (highest grade). Each QoS grade is associated with particular one-way latency requirements, defined by the associated value of parameter delay_max, in the range between 1 ms and 12 ms. The values of delay_max_N for each QoS grade are defined by corresponding distribution point unit (DPU) MIB parameters DELAY_MAX_0, DELAY_MAX_1, and DELAY_MAX_2. The QoS grade tags of the packets are conveyed to the receive side. The DTUs are passed to the PMS-TC together with an associated DPU QoS grade tag (e.g., the highest DTU tag and the lowest DTU tag in FIG. 1) that includes the highest QoS grade and the lowest QoS grade of the packets encapsulated into the DTU as shown in Table 3 below. In some embodiments, this tag is used to schedule transmission and retransmission of DTUs carrying packets of different QoS grades.

TABLE 3

DTU flow control primitives at the $\alpha$ reference point

| Primitive | Direction | Description |
|---|---|---|
| TX DTU Req | PMS-TC → TPS-TC | Primitive indicating that the PMS-TC is requesting a DTU from the TPS-TC (Note 1). |
| Dummy DTU Req | | Primitive indicating that the PMS-TC is requesting a dummy DTU from the TPS-TC (Note 1). |
| Dummy DTU Ind | TPS-TC → PMS-TC | Primitive indicating that the DTU passed to the PMS-TC is a dummy DTU (Note 3). |
| RX DTU Enable | | Primitive indicating that the TPS-TC is ready to receive a DTU from the PMS-TC. Valid only at FTU-O (Note 2). |
| DTU QoS grade tag | | The tag contains primitives that indicate the lowest QoS grade and the highest QoS grade of the packets encapsulated in the DTU. |

(Note 1) -
The TX DTU Req primitive is turned off if the PMS-TC is unable to receive a DTU (e.g., the DTU queue is full). The PMS-TC shall raise the Dummy DTU Req primitive if PMS-TC requires a dummy DTU (see clause 8.2.2) instead of a data DTU.
(Note 2) -
The TPS-TC shall turn the RX DTU Enable primitive off in case the TPS-TC cannot receive DTUs from the PMS-TC, e.g., when the RX Enable primitive is off at the γo reference point.
(Note 3) -
The TPS-TC shall send a dummy DTU to the PMS-TC and raise the Dummy DTU Ind primitive when either:
The TX DTU Req primitive is turned on but no DTU filled with user data or management data is available, or
The Dummy DTU Req primitive is turned on.

In the receive direction, data packets are recovered from the DTUs crossing the $\alpha_O$ reference point. The QoS grades indicated in the received data packets are used to by the receiver to facilitate latency requirement for each QoS grade in the STREAMus.

Figure 9:
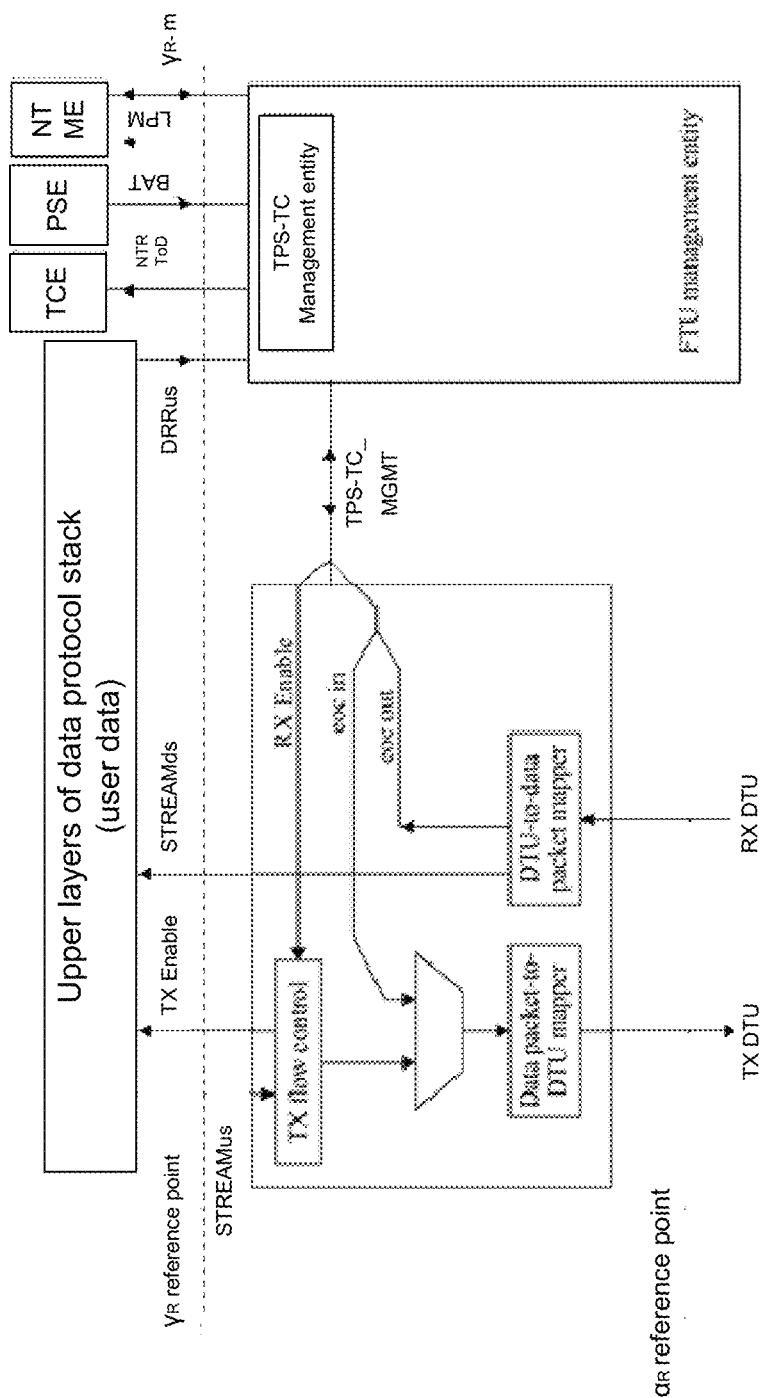
FIG. 9 illustrates a functional reference model of a transceiver circuit, according to various embodiments described herein.

FIG. 9 illustrates a functional reference model of a transceiver circuit 900, according to various embodiments described herein. In some embodiments, the transceiver circuit 900 complies with a fast transceiver unit (FTU) defined in the recommendation ITU-T G.9701 and has all the features defined in the recommendation ITU-T G.9701. In particular, the transceiver circuit 900 comprises an FTU at the remote site (FTU-R) defined in ITU-T G.9701. In some embodiments, the functional reference model of the transceiver circuit 900 is applicable to the second transceiver circuit 104 in FIG. 1. The FTU functional reference model comprises a transport protocol specific transmission convergence (TPS-TC) sub-layer that resides between γ and α reference points, and the physical media specific part of the transmission convergence (PMS-TC) sub-layer and the physical media dependent (PMD) sub-layer, which reside between α and U reference points.

In some embodiments, in the transmit direction, the data packets (STREAMus) crossing the $\gamma_R$ reference point are encapsulated into data transfer units (DTUs) that are passed to the PMS-TC across the $\alpha_R$ reference point. The data packets comprising STREAMus, are passed across the $\gamma_R$ reference point with tags (See table 2 above) associated with the respective QoS grade. These tags are transferred over the line in the DTUs. The DTUs are transferred towards the PMS-TC with DTU QoS grade tag, as defined in Table 3. In the receive direction, data packets are recovered from the DTUs crossing the $\alpha_R$ reference point. The recovered data packets (STREAMds) are conveyed to the NT's L2+ functional block across the $\gamma_R$ reference point. The QoS grades indicated in the received data packets are used to implement latency requirements of each QoS grade in the STREAMds. The respective values of delay_max_N in the downstream direction are passed to the FTU-R during initialization.

While the apparatus has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a transceiver associated with a wireline communication system, comprising a memory configured to store a plurality of instructions; and one or more processors configured to retrieve the plurality of instructions from the memory, and upon execution of the plurality of instructions is configured to associate a quality of service (QoS) grade tag to each data packet of a plurality of data packets to be transmitted, wherein the QoS grade tag is indicative of a QoS grade of the respective data packets; assemble a data transfer unit (DTU) comprising one or more or a part of a data packet of the plurality of data packets, wherein the one or more or the part of the data packet are encapsulated into a plurality of DTU frames within the DTU, each DTU frame being associated with the QoS grade of a data packet encapsulated within the respective DTU frame; associate a highest DTU tag to the assembled DTU, wherein the highest DTU tag is indicative of a highest QoS grade associated with the DTU frames of the assembled DTU; and determine a schedule for transmission of the assembled DTU or retransmission of the assembled DTU, or both, based on the highest DTU tag of the assembled DTU.

Example 2 is a transceiver, including the subject matter of example 1, wherein the one or more processors is further configured to associate a lowest DTU tag to the assembled DTU, wherein the lowest DTU tag is indicative of a lowest QoS grade associated with the DTU frames in the assembled DTU; and determine an age at which the assembled DTU shall be discarded based on the lowest DTU tag of the assembled DTU.

Example 3 is a transceiver, including the subject matter of examples 1-2, including or omitting elements, wherein the one or more processors is further configured to communicate the lowest QoS grade associated with the DTU in a DTU header associated with the DTU.

Example 4 is a transceiver, including the subject matter of examples 1-3, including or omitting elements, wherein the one or more processors is further configured to communicate QoS grades associated with the DTU frames within the DTU.

Example 5 is a transceiver, including the subject matter of examples 1-4, including or omitting elements, wherein the one or more processors is configured to communicate the QoS grades associated with the DTU frames, in DTU frame headers associated with the DTU frames.

Example 6 is a transceiver, including the subject matter of examples 1-5, including or omitting elements, wherein the one or more processors is further configured to determine one or more aged DTU frames within the DTU, based on the QoS grades associated with the respective DTU frames, and provide an indication of the one or more aged DTU frames within the DTU.

Example 7 is a transceiver, including the subject matter of examples 1-6, including or omitting elements, wherein the one or more processors is configured to provide the indication of the one or more aged DTU frames, in a DTU header associated with the DTU.

Example 8 is a transceiver, including the subject matter of examples 1-7, including or omitting elements, wherein the one or more processors is further configured to provide the indication of the one or more aged DTU frames, in DTU frame headers associated with the respective aged DTU frames.

Example 9 is a transceiver, including the subject matter of examples 1-8, including or omitting elements, wherein in scheduling the transmission or retransmission of the assembled DTU, a DTU for retransmission with a higher highest DTU tag has priority over a DTU for retransmission with a lower highest DTU tag.

Example 10 is a transceiver, including the subject matter of examples 1-9, including or omitting elements, wherein in scheduling the transmission or retransmission of the assembled DTU, a DTU for retransmission has priority over a DTU for transmission when they both have the same highest DTU tag.

Example 11 is a transceiver, including the subject matter of examples 1-10, including or omitting elements, wherein in scheduling the transmission or retransmission of the assembled DTU, a DTU identified as last chance transmission DTU for retransmission has priority over a DTU for transmission or a DTU for retransmission, irrespective of their respective highest DTU tags.

Example 12 is a transceiver associated with a wireline communication system, comprising a memory configured to store a plurality of instructions; and one or more processors configured to retrieve the plurality of instructions from the memory, and upon execution of the plurality of instructions is configured to associate a quality of service (QoS) grade tag to each data packet of a plurality of data packets to be transmitted, wherein the QoS grade tag is indicative of a QoS grade of the respective data packets; assemble a data transfer unit (DTU) comprising one or more or a part of a data packet of the plurality of data packets, wherein the one or more or the part of the data packet are encapsulated into a plurality of DTU frames within the DTU, each DTU frame being associated with the QoS grade of a data packet encapsulated within the respective DTU frame; associate a lowest DTU tag to the assembled DTU, wherein the lowest DTU tag is indicative of a lowest QoS grade associated with the DTU frames in the assembled DTU; and determine an age at which the assembled DTU shall be discarded based on the lowest DTU tag of the assembled DTU.

Example 13 is a transceiver, including the subject matter of example 12, wherein the one or more processors is further configured to associate a highest DTU tag to the assembled DTU, wherein the highest DTU tag is indicative of a highest QoS grade associated with the DTU frames of the assembled DTU; and determine a schedule for transmission of the assembled DTU or retransmission of the assembled DTU, or both, based on the highest DTU tag of the assembled DTU.

Example 14 is a transceiver, including the subject matter of examples 12-13, including or omitting elements, wherein the one or more processors is further configured to communicate the lowest QoS grade associated with the DTU in a DTU header associated with the DTU.

Example 15 is a transceiver, including the subject matter of examples 12-14, including or omitting elements, wherein the one or more processors is further configured to communicate the QoS grades associated with the DTU frames within the DTU.

Example 16 is a transceiver, including the subject matter of examples 12-15, including or omitting elements, wherein the one or more processors is further configured to provide an indication of one or more aged DTU frames of the DTU, within the DTU.

Example 17 is a transceiver, including the subject matter of examples 12-16, including or omitting elements, wherein in scheduling the transmission or retransmission of the assembled DTU, a DTU for retransmission with a higher highest DTU tag has priority over a DTU for retransmission with a lower highest DTU tag.

Example 18 is a transceiver, including the subject matter of examples 12-17, including or omitting elements, wherein in scheduling the transmission or retransmission of the assembled DTU, a DTU for retransmission has priority over a DTU for transmission when they both have the same highest DTU tag.

Example 19 is a transceiver, including the subject matter of examples 12-18, including or omitting elements, wherein in scheduling the transmission or retransmission of the assembled DTU, a DTU identified as last chance transmission DTU for retransmission has priority over a DTU for transmission or a DTU for retransmission, irrespective of their respective highest DTU tags.

Example 20 is a transceiver associated with a wireline communication system, comprising a memory configured to store a plurality of instructions; and one or more processors configured to retrieve the plurality of instructions from the memory, and upon execution of the plurality of instructions is configured to receive a data transfer unit (DTU) comprising one or more or a part of a data packet, wherein the one or more or the part of the data packet are encapsulated into a plurality of DTU frames within the DTU, each DTU frame being associated with a QoS grade of a data packet encapsulated within the respective DTU frame; and determine an age at which the DTU shall be discarded, based on information of a lowest QoS grade associated with the DTU, provided within the DTU.

Example 21 is a transceiver, including the subject matter of example 20, wherein the one or more processors is further configured to determine an age at which one or more DTU frames within the DTU shall be discarded, based on information provided within the DTU.

Example 22 is a transceiver, including the subject matter of example 20-21, including or omitting elements, wherein the one or more processors is configured to determine the age at which the one or more DTU frames shall be discarded based on an indication of aged DTU frames, provided within the DTU.

Example 23 is a transceiver, including the subject matter of example 20-22, including or omitting elements, wherein the one or more processors is configured to determine the age at which the one or more DTU frames shall be discarded, based on information of QoS grades associated with the DTU frames of the DTU, provided within the DTU.

Example 24 is a transceiver, including the subject matter of example 20-23, including or omitting elements, wherein the one or more processors is further configured to discard the DTU, when the DTU is determined to be aged.

Various illustrative logics, logical blocks, modules, and circuits described in connection with aspects disclosed herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A transceiver associated with a wireline communication system, comprising:
   a memory configured to store a plurality of instructions; and
   one or more processors configured to retrieve the plurality of instructions from the memory, and upon execution of the plurality of instructions is configured to:
   associate a quality of service (QoS) grade tag to each data packet of a plurality of data packets to be transmitted, wherein the QoS grade tag is indicative of a QoS grade of the respective data packets;
   assemble a data transfer unit (DTU) comprising one or more or a part of a data packet of the plurality of data packets, wherein the one or more or the part of the data packet are encapsulated into a plurality of DTU frames within the DTU, each DTU frame being associated with the QoS grade of a data packet encapsulated within the respective DTU frame;
   associate a highest DTU tag to the assembled DTU, wherein the highest DTU tag is indicative of a highest QoS grade among QoS grades associated with the plurality of DTU frames of the assembled DTU; and
   determine a schedule for transmission of the assembled DTU or retransmission of the assembled DTU, or both, based on the highest DTU tag of the assembled DTU.

2. The transceiver of claim 1, wherein the one or more processors is further configured to:
    associate a lowest DTU tag to the assembled DTU, wherein the lowest DTU tag is indicative of a lowest QoS grade among the QoS grades associated with the plurality of DTU frames in the assembled DTU; and
    determine an age at which the assembled DTU shall be discarded based on the lowest DTU tag of the assembled DTU.

3. The transceiver of claim 2, wherein the one or more processors is further configured to communicate the lowest QoS grade associated with the DTU in a DTU header associated with the DTU.

4. The transceiver of claim 1, wherein the one or more processors is further configured to communicate QoS grades associated with the DTU frames within the DTU.

5. The transceiver of claim 4, wherein the one or more processors is configured to communicate the QoS grades associated with the DTU frames, in DTU frame headers associated with the DTU frames.

6. The transceiver of claim 1, wherein the one or more processors is further configured to:
    determine one or more aged DTU frames within the DTU, based on the QoS grades associated with the respective DTU frames, and
    provide an indication of the one or more aged DTU frames within the DTU.

7. The transceiver of claim 6, wherein the one or more processors is configured to provide the indication of the one or more aged DTU frames, in a DTU header associated with the DTU.

8. The transceiver of claim 6, wherein the one or more processors is further configured to provide the indication of the one or more aged DTU frames, in DTU frame headers associated with the respective aged DTU frames.

9. The transceiver of claim 1, wherein in scheduling the transmission or retransmission of the assembled DTU, a DTU for retransmission with a higher highest DTU tag has priority over a DTU for retransmission with a lower highest DTU tag.

10. The transceiver of claim 2, wherein in scheduling the transmission or retransmission of the assembled DTU, a DTU for retransmission has priority over a DTU for transmission when they both have the same highest DTU tag.

11. The transceiver of claim 2, wherein in scheduling the transmission or retransmission of the assembled DTU, a DTU identified as last chance transmission DTU for retransmission has priority over a DTU for transmission or a DTU for retransmission, irrespective of their respective highest DTU tags.

12. A transceiver associated with a wireline communication system, comprising:
    a memory configured to store a plurality of instructions; and
    one or more processors configured to retrieve the plurality of instructions from the memory, and upon execution of the plurality of instructions is configured to:
    associate a quality of service (QoS) grade tag to each data packet of a plurality of data packets to be transmitted, wherein the QoS grade tag is indicative of a QoS grade of the respective data packets;
    assemble a data transfer unit (DTU) comprising one or more or a part of a data packet of the plurality of data packets, wherein the one or more or the part of the data packet are encapsulated into a plurality of DTU frames within the DTU, each DTU frame being associated with the QoS grade of a data packet encapsulated within the respective DTU frame;
    associate a lowest DTU tag to the assembled DTU, wherein the lowest DTU tag is indicative of a lowest QoS grade among QoS grades associated with the plurality of DTU frames in the assembled DTU; and
    determine an age at which the assembled DTU shall be discarded based on the lowest DTU tag of the assembled DTU.

13. The transceiver of claim 12, wherein the one or more processors is further configured to:
    associate a highest DTU tag to the assembled DTU, wherein the highest DTU tag is indicative of a highest QoS grade among QoS grades associated with the plurality of DTU frames of the assembled DTU; and
    determine a schedule for transmission of the assembled DTU or retransmission of the assembled DTU, or both, based on the highest DTU tag of the assembled DTU.

14. The transceiver of claim 12, wherein the one or more processors is further configured to communicate the lowest QoS grade associated with the DTU in a DTU header associated with the DTU.

15. The transceiver of claim 12, wherein the one or more processors is further configured to communicate the QoS grades associated with the DTU frames within the DTU.

16. The transceiver of claim 12, wherein the one or more processors is further configured to provide an indication of one or more aged DTU frames of the DTU, within the DTU.

17. The transceiver of claim 13, wherein in scheduling the transmission or retransmission of the assembled DTU, a DTU for retransmission with a higher highest DTU tag has priority over a DTU for retransmission with a lower highest DTU tag.

18. The transceiver of claim 13, wherein in scheduling the transmission or retransmission of the assembled DTU, a DTU for retransmission has priority over a DTU for transmission when they both have the same highest DTU tag.

19. The transceiver of claim 13, wherein in scheduling the transmission or retransmission of the assembled DTU, a DTU identified as last chance transmission DTU for retransmission has priority over a DTU for transmission or a DTU for retransmission, irrespective of their respective highest DTU tags.

20. A transceiver associated with a wireline communication system, comprising:
    a memory configured to store a plurality of instructions; and
    one or more processors configured to retrieve the plurality of instructions from the memory, and upon execution of the plurality of instructions is configured to:
    receive a data transfer unit (DTU) comprising one or more or a part of a data packet, wherein the one or more or the part of the data packet are encapsulated into a plurality of DTU frames within the DTU, each DTU frame being associated with a QoS grade of a data packet encapsulated within the respective DTU frame; and
    determine an age at which the DTU shall be discarded, based on information of a lowest QoS grade associated with the DTU, provided within the DTU.

21. The transceiver of claim 20, wherein the one or more processors is further configured to determine an age at which one or more DTU frames within the DTU shall be discarded, based on information provided within the DTU.

22. The transceiver of claim 20, wherein the one or more processors is configured to determine the age at which the one or more DTU frames shall be discarded based on an indication of aged DTU frames, provided within the DTU.

23. The transceiver of claim 22, wherein the one or more processors is configured to determine the age at which the one or more DTU frames shall be discarded, based on information of QoS grades associated with the DTU frames of the DTU, provided within the DTU.

24. The transceiver of claim 21, wherein the one or more processors is further configured to discard the DTU, when the DTU is determined to be aged.

* * * * *